US006924333B2

(12) United States Patent
Bloom et al.

(10) Patent No.: US 6,924,333 B2
(45) Date of Patent: Aug. 2, 2005

(54) POLYUNSATURATED FATTY ACIDS AS PART OF REACTIVE STRUCTURES FOR LATEX PAINTS: THICKENERS, SURFACTANTS, AND DISPERSANTS

(75) Inventors: Paul D. Bloom, Decatur, IL (US); George B. Poppe, Forsyth, IL (US); Arthur F. Rich, Lake in the Hills, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 10/324,067

(22) Filed: Dec. 20, 2002

(65) Prior Publication Data

US 2003/0187103 A1 Oct. 2, 2003

Related U.S. Application Data

(60) Provisional application No. 60/344,044, filed on Jan. 3, 2002.

(51) Int. Cl.[7] .................................................. C08K 5/10
(52) U.S. Cl. ...................... 524/315; 524/313; 524/314; 524/315; 524/328; 524/284; 524/270; 523/504
(58) Field of Search ................................ 524/313, 314, 524/312, 328, 284, 270, 315; 523/504

(56) References Cited

U.S. PATENT DOCUMENTS

| 3,770,684 A | 11/1973 | Singer et al. | ................ 524/199 |
| 4,218,262 A | 8/1980 | Warren | ........................ 106/206 |

(Continued)

FOREIGN PATENT DOCUMENTS

| DE | 31 40 160 A1 | 6/1982 |
| DE | 32 39 564 C1 | 5/1984 |
| DE | 35 41 813 A1 | 6/1987 |
| DE | 38 43 224 A1 | 6/1990 |
| DE | 43 07 533 A1 | 9/1994 |
| EP | 0 303 187 A2 | 2/1989 |
| EP | 1 044 993 A1 | 10/2000 |
| WO | WO 00/75243 A1 | 12/2000 |

OTHER PUBLICATIONS

Huldén, M., "Hydrophobically modified urethane–ethoxylate (HEUR) associative thickeners 1. Rheology of aqueous solutions and interactions with surfactants," *Colloids and Surfaces A: Physicochemical and Engineering Aspects* 82:263–277, Elsevier Science B.V. (1994).

International Search Report for International Application No. PCT/US 02/39899, mailed Apr. 8, 2003.

Shay, G.D. and Rich, A.F., "Urethane–Functional Alkali–Soluble Associative Latex Thickeners," *J. Coatings Tech.* 58:43–53, The Federation of Societies for Coatings Technology (Jan. 1986).

*Primary Examiner*—Tatyana Zalkaeva
*Assistant Examiner*—Satya B Sastri
(74) *Attorney, Agent, or Firm*—Sterne, Kessler, Goldstein & Fox P.L.L.C.

(57) ABSTRACT

The present invention is directed to a latex paint composition comprising polyunsaturated fatty acid containing additives derived from vegetable oils. In preferred embodiments, traditional water soluble additives such as thickeners, surfactants and dispersants are replaced with polyunsaturated fatty acid derivatives, adducts or polyunsaturated fatty acid containing polymers. The polyunsaturated fatty acid containing additives reduce or eliminate the need for traditional water soluble additives that lower the water resistance of the dry paint film. Additionally, the polyunsaturated fatty acid moieties are capable of oxidative crosslinking during the curing process, forming a dry paint film that is more durable and water-resistant than traditional latex paint compositions.

21 Claims, 7 Drawing Sheets

U.S. PATENT DOCUMENTS

| | | | |
|---|---|---|---|
| 4,228,277 A | 10/1980 | Landoll | 536/90 |
| 4,352,916 A | 10/1982 | Landoll | 526/200 |
| 4,398,045 A | 8/1983 | Sebag | 424/63 |
| 4,426,485 A | 1/1984 | Hoy et al. | 524/591 |
| 4,451,608 A * | 5/1984 | Drake et al. | 524/560 |
| 4,533,545 A | 8/1985 | Sebag | 424/70 |
| 4,614,622 A | 9/1986 | Huettinger et al. | 260/410.7 |
| 4,902,733 A | 2/1990 | Angerer | 524/44 |
| 5,120,838 A | 6/1992 | Just et al. | 536/90 |
| 5,124,445 A | 6/1992 | Just et al. | 536/84 |
| 5,391,359 A | 2/1995 | Patel | 427/180 |
| 5,753,742 A * | 5/1998 | Bumanlag | 524/501 |
| 6,174,948 B1 | 1/2001 | Thames et al. | 524/894 |
| 6,177,510 B1 * | 1/2001 | Saam | 524/773 |
| 6,203,720 B1 | 3/2001 | Thames et al. | 106/238 |
| 6,613,817 B2 * | 9/2003 | Bouvy et al. | 523/503 |
| 2004/0039095 A1 * | 2/2004 | Van de Mark et al. | 524/315 |

* cited by examiner

| % COALESCING AID PER LATEX wt SOLIDS | 0% | 2% | 3% | 4% | 5% | 6% | 7% | 8% | 9% | 10% | 11% | 12% | 14% | 16% | 20% |
|---|---|---|---|---|---|---|---|---|---|---|---|---|---|---|---|
| PAINT FORMULA | | PSG#2B | PSG#2B | PSG#2B | PSG#2B | PSG#2B | PSG#2B | PSG#2B | PSG#2B | PSG#2B | PSG#2B | PSG#2B | PSG#2B | PSG#2B | PSG#2B |
| 50° GLOSS (SEALED) 1 DAY CURE | 0% | 2% | 3% | 4% | 5% | 6% | 7% | 8% | 9% | 10% | 11% | 12% | 14% | 16% | 20% |
| WATER | 51.4 | | | | | | | | | | | | | | |
| TEXANOL ® | | 51.6 | | 53.2 | 53.1 | 54.1 | | 53.3 | | | | | | | |
| PGME | | | 55.1 | 55.4 | | 53.9 | | 53.4 | | 56.7 | | | | | |
| VELATE 368 | | 54.3 | | 54.7 | 54.4 | 55.3 | | 56.9 | | 58.8 | | | | | |
| BUTYL-CARBITOL | | | | 54.4 | | 54.8 | | 54.8 | 53.8 | | 52.2 | 53.2 | 51.8 | 52.5 | 50.4 |
| BUTYL-CELLOSOLVE | | | | 53.0 | | 52.8 | | 53.1 | | | | | | | |
| 85° SHEEN (SEALED) | | | | | | | | | | | | | | | |
| NO COALESCENT (WATER) | 82.9 | | | | | | | | | | | | | | |
| TEXANOL ® | | 84.7 | | 84.9 | 84.5 | 85.1 | | 85.3 | | | | | | | |
| PGME | | | 86.1 | 84.4 | | 82.7 | | 82.8 | | 84.2 | | | | | |
| VELATE 368 | | 84.9 | | 84.7 | 86.9 | 86.9 | | 84.2 | | 87.5 | | | | | |
| BUTYL-CARBITOL | | | | 85.9 | | 85.6 | | 84.9 | 86.0 | | 84.9 | 85.4 | 83.3 | 83.6 | 82.5 |
| BUTYL-CELLOSOLVE | | | | 85.1 | | 84.7 | | 84.2 | | | | | | | |

FIG.3

| % COALESCING AID PER LATEX wt SOLIDS | 0% | 2% | 3% | 4% | 5% | 6% | 7% | 8% | 9% | 10% | 11% | 12% | 14% | 16% | 20% |
|---|---|---|---|---|---|---|---|---|---|---|---|---|---|---|---|
| PAINT FORMULA | | PSG#2B | PSG#2B | PSG#2B | PSG#2B | PSG#2B | PSG#2B | PSG#2B | PSG#2B | PSG#2B | PSG#2B | PSG#2B | PSG#2B | PSG#2B | PSG#2B |
| CONTRAST RATIO (3 mil) BLACK/WHITE 4 READING AVG | | | | | | | | | | | | | | | |
| NO COALESCENT (WATER) | 0.9642 | | | | | | | | | | | | | | |
| TEXANOL® | | | | 0.9681 | 0.9667 | 0.9671 | 0.9697 | 0.9697 | | 0.9712 | | | | | |
| PGME | | | | | 0.9680 | 0.9688 | | 0.9707 | | 0.9673 | | | | | |
| VELATE 368 | | 0.9629 | 0.9651 | 0.9653 | 0.9622 | 0.9648 | | 0.9646 | | | | | | | |
| BUTYL-CARBITOL | | | | 0.9633 | | 0.9638 | | 0.9642 | 0.9649 | | 0.9655 | 0.9636 | | 0.9661 | |
| BUTYL-CELLOSOLVE | | | | 0.9652 | | 0.9634 | | 0.9630 | | | | | 0.9632 | | 0.9631 |
| SX LIGHT SCATTERING (3 MIL) BLACK/WHITE 4 AVG | | | | | | | | | | | | | | | |
| NO COALESCENT (WATER) | 7.42 | | | | | | | | | | | | | | |
| TEXANOL® | | | | 7.87 | 7.76 | 7.78 | 8.09 | 8.15 | | 8.40 | | | | | |
| PGME | | | | | 7.88 | 8.00 | | 8.28 | | 7.78 | | | | | |
| VELATE 368 | | 7.33 | 7.53 | 7.53 | 7.22 | 7.48 | | 7.46 | | | | | | | |
| BUTYL-CARBITOL | | | | 7.35 | | 7.40 | | 7.45 | 7.55 | | 7.53 | 7.38 | | 7.67 | |
| BUTYL-CELLOSOLVE | | | | 7.56 | | 7.31 | | 7.32 | | | | | 7.36 | | 7.31 |

FIG. 4

ROVACE 9100/Ucar 6030 (18%) LATEX BLEND (NOT PAINT)

STORMER VISCOSITY (KREBS UNITS)

| % COALESCENT ON LATEX SOLIDS | 0% | 2% | 4% | 6% | 8% |
|---|---|---|---|---|---|
| NO COALESCENT (WATER) | 47.9 | | | | |
| TEXANOL® | | 43.6* | 46.9 | 47.2 | 48.2 |
| PGME | | 47.0 | 46.5 | 47.9 | 47.9 |

* VOLUME LOWER THAN 1/2 PINT CAN (LOWER VISCOSITY)

ROVACE 9100/Ucar 6030 (18%) LATEX BLEND (NOT PAINT)

BROOKFIELD (cP), 60 rpm, #2 SPINDLE (STD LATEX VISCOSITY MEASUREMENT)

| % COALESCENT ON LATEX SOLIDS | 0% | 2% | 4% | 6% | 8% |
|---|---|---|---|---|---|
| NO COALESCENT (WATER) | 36 | | | | |
| TEXANOL® | | 27 | 30 | 35 | 42 |
| PGME | | 27 | 30 | 36 | 41 |

FIG.5

POLYUNSATURATED FATTY ACIDS AS PART OF REACTIVE STRUCTURES FOR LATEX PAINTS: THICKENERS, SURFACTANTS, AND DISPERSANTS

BACKGROUND OF THE INVENTION

Field of the Invention

Water-base latex paint is comprised of an aqueous dispersion of pigments and latex particles that impart substrate hide, water resistance, and durability to the solid paint film. Other components such as dispersants, surfactants, and thickeners are added to the liquid paint to maintain a stable dispersion and suspension of the pigments and latex particles. Solvents, bases, defoamers, and biocides are also incorporated to improve liquid stability, application performance and film formation properties. The chemical composition of water-base latex paints is designed to allow dispersion of components in water, yet maintain water resistance upon curing and forming a dry paint film. Essentially, the compositions are designed to contain a hydrophobic component for water resistance as a paint film, and a hydrophilic component to improve stability, solubility, and dispersion in the liquid aqueous phase.

A latex polymer is a high molecular weight component which imparts water resistance and durability to the dry paint film. These latex polymers include polymerization and co-polymerization products of: vinyl acetate, acrylic acid, methacrylic acid, styrene, alpha-methyl styrene, butadiene, acrylates, methacrylates, vinyl chloride, vinylidene chloride and acrylonitrile containing monomers. Particularly important are polymers and co-polymers of alkyl acrylates, alkyl methacrylates, styrene, and vinyl acetate.

Nonionic surfactants, nonionic and anionic dispersants, nonionic thickeners, anionic alkali swellable thickeners, and water soluble cellulosic thickeners are used in paint compositions to separate, suspend and stabilize latex particles and pigment particles. Generally, the structures of these paint components contain a hydrophobic functionality synthetically combined with a hydrophillic functionality. Inorganic pigments are relatively heavy particles that would agglomerate and settle at the bottom of a container of latex paint without the use of anionic surfactants as well as various dispersants and thickeners for suspension.

Latex polymers are the film-forming portions of the paint film, and are prepared by an emulsion polymerization reaction. Aggregation of polymer particles is typically discouraged by including a stabilizing surfactant in the polymerization mix. In general, the growing latex particles are stabilized during emulsion polymerization by one or more surfactants such as an anionic or nonionic surfactant, or a mixture thereof, as is well known in the polymerization art. Many examples of surfactants suitable for emulsion polymerization are given in McCutcheon's Detergents and Emulsifiers (MC Publishing Co., Glen Rock, N.J.), published annually. Generally, emulsion polymerization consists of using nonionic surfactants to create monomer micelles within the water phase.

Nonionic surfactants are generally low molecular weight hydrophobic carbon chains that also contain hydrophilic segments. Upon addition of sufficient surfactant and mechanical agitation, the hydrophobic end groups associate with each other to form micelles, and the hydrophilic segments extend into the water phase.

The micelles are a locus for the polymerization reaction. The hydrophobic monomers, initiators, and terminators of the polymeric reaction migrate within the micelle. As the polymerization reaction progresses, the polymer products are suspended within these micelles. Such emulsion polymerization produces latex polymers that are contained in the micelles. Once added to the latex polymer emulsions, associative thickeners can also suspend these micelles through partial absorption of the thickener's hydrophobes into the micelle. The thickener's hydrophobes associate with the hydrophobic polymer and the micelle's nonionic surfactant hydrophobic component as well as other thickener hydrophobes to create hydrophobic networks. These networks increase viscosity, suspension and separation of polymer micelles.

The effectiveness of the latex polymer in forming a film after the paint has been deposited upon a surface depends upon the glass transition temperature (Tg) of the polymer and the temperature at which the paint film is allowed to dry. Coalescing aids, compounds compatible with the polymer, have been used in latex paints to plasticize (soften) the latex polymer to allow the formation of a continuous film with optimum coating properties once the water has evaporated. Without the coalescing aid, the coatings may crack and fail to adhere to the substrate when dry. Traditionally, such coalescing aids (generally alcohol esters and ethers) are volatile and leave the film after they have enabled the polymer to coalesce into an integral film. Once the coalescing aids are gone, the original hardness of the polymer, defined by its initial Tg, returns yielding a tougher and more resistant coating.

The linkages through which a hydrophilic group and a hydrophobic group are combined in a single component or additive are critical in maintaining the structural integrity and avoiding compositional degradation. Hydrolysis is the major reaction that can occur in an aqueous environment. Thickeners, surfactants, and other components generally use ester, ether, or urethane linkages to combine the hydrophilic and hydrophobic moieties. The choice of linkages is determined by cost, process feasibility, and end use value.

Ester linkages can be susceptible to hydrolysis to varying degrees depending upon the structure of the ester and its chemical environment. If the ester is hydrolyzed, the end use functionality is reduced or terminated and in-can stability is no longer provided by the additive. One or more carbon chains attached near the ester linkage create stearic hindrance and afford some protection for the ester carbonyl from hydrolysis. The art teaches alkali swellable hydrophobic thickeners which utilize an ester linkage. Ester linkages are found on hydrophobic ester alcohols used as coalescing aids. These coalescing aids migrate to the hydrophobic interior of a latex micelle. Components within hydrophobic portions of a micelle are shielded from water contact which help to reduce cleavage by hydrolysis.

Ether linkages are more stable under hydrolytic conditions than ester linkages. Ether alcohol solvents are used as drying solvents for water base paints although these compositions also act as coalescing aids. Glycol ethers generally reside in the water phase of the paint; therefore, the ether linkage is helpful to prevent hydrolysis.

Urethane bonds are useful chemical bonds for components that require functionality within the water phase of the paint. Usually one or more hydrophobes are incorporated in isocyanate containing compounds. This adduct is reacted with a hydroxy-containing water-soluble component, resulting in a urethane linkage. Urethane linkages are much less prone to hydrolysis than ester linkages, and are therefore used extensively in ethoxylated polyurethane thickeners and associative alkali swellable thickeners.

Generally the hydrophobe group is a nonyl-phenol, octylphenol or octadecyl. The general structure is a substituted phenol ring containing a carbon chain of various lengths. The hydroxyl group of the phenol is the locus for chemically attaching a hydrophilic functional group to yield an additive with the functionality of a surfactant or thickener. The reaction can vary based on the linkage requirement for hydrolytic stability.

Thickeners, also referred to as rheology modifiers, have several roles in aqueous systems. They increase viscosity, maintain viscosity at required levels under specified processing conditions, provide improved stability, pigment suspension and application properties. Thickeners are used in coatings to impart viscosity through water-soluble hydrodynamic thickening (hydrogen bonding) and hydrophobic associative thickening mechanisms. The hydrophobic and hydrophobic/hydrophilic balance are critical to control the suspension, flow and stability/suspension properties of paint. Thus, thickeners can be used to control the balance of hydrophobic and hydrophilic properties, and, consequently, the degree of water sensitivity in a paint film.

Many natural and synthetic thickeners are known. Natural thickeners include, for example, casein, alginates, xanthan gum, gum tragacanth, and modified celluloses, such as methyl cellulose, hydroxyethyl cellulose, hydroxypropyl cellulose and carbomethoxy cellulose. These natural products vary in their thickening efficiency and generally provide poor flow and leveling properties. They are subject to microbial attack and require the additional presence of antimicrobial agents. Synthetic thickeners include various acrylic polymers and maleic anhydride copolymers. Polyethylenes have found particular application as latex paint thickeners. Thickening properties of some of these thickeners are found to be one or more of the following: pH dependent, hydrolytically unstable, inefficient thus requiring large amounts of thickener to effectively increase viscosity, and/or sensitive to various components normally found in aqueous coatings.

A variety of methods have been used to improve the thickening properties of aqueous solutions. For example, the effect of added surfactant on aqueous phase viscosity in the presence of hydrophobically-modified urethane-ethoxylate polymers is disclosed by M. Hulden in Colloids and Surfaces A: Physicochemical and Engineering Aspects, 82, pp 263–277 (1996).

Hydrophobe-modified, water-soluble polymers, e.g., hydrophobically modified cellulose ethers, have found extensive use in the latex paint industry as additives to provide associative thickening and rheology modification. Associative thickening can be described as a thickening mechanism whereby the hydrophobic substituents of the polymer molecules interact intra- or intermolecularly with other hydrophobes to provide desirable thickening characteristics such as high viscosity at low shear. In many cases, the hydrophobic substituents of the polymers can affect the rheology of the latex composition providing enhanced flow and leveling properties. Typical hydrophobic substituents used to derivatize polymers such as cellulose ethers include long chain alkyl epoxides, e.g., 1,2-epoxyhexadecane and glycidyl ethers with long alkyl chains, e.g., nonylphenyl glycidyl ether. Thus, the hydrophobe-modified, water-soluble polymers are additives in latex compositions.

Accordingly, hydrophobe-modified cellulose ether derivatives are desired which can provide associative thickening and theological modification properties to latex compositions for the purposes of storage and application of the latex to a surface to be coated.

Cellulose ethers have been used widely in the paint industry as thickeners for emulsion paints. Although these products like hydroxyethyl cellulose, methylcellulose derivatives, ethylhydroxyethyl cellulose and carboxymethyl-cellulose provide the paints with a number of good paint properties, these materials demonstrate shortcomings in the area of rheology.

Associative cellulose ethers possess better performance properties. However, associative thickeners like hydrophobically modified ethoxylated urethanes (HEURS) are not useful as a single thickener in medium to highly pigmented latex paints because the amount of binder present in these paints is relatively low. Associative thickeners like hydrophobically modified hydroxyethylcellulose (HMHEC) were developed. These HMHEC products perform well in flow, film build, and spatter resistance in paints as compared to products prepared with other well known cellulosic polymers. The HMHEC products thicken the paint by dual mechanism, i.e., water phase thickening and network formation through hydrophobic interactions, and can, therefore, be used as a single thickener. The HMHEC products are hydrophobically modified cellulose ether derivatives modified with long chain alkyl groups described in U.S. Pat. Nos. 4,228,277 and 4,352,916. Other patents that describe different hydrophobically modified cellulose ethers useful in paints are U.S. Pat. Nos. 4,902,733, 5,124,445 and 5,120,838.

Thickeners for aqueous solutions, which are effective irrespective of the surfactant type, belong to the group of water-soluble polymers. Suitable additives here are cellulose derivatives and xanthans. Polyethylene glycol derivatives (German Patent 3,140,160), polyol monoethers (European Patent 0,303,187), fatty acid-esterified polyoxyalkylene ethers of glycerol or propane-1,2-diol (German Patent 3,239,564) or other polyhydric alcohols (German Patent 3,843,224), and alkylpolyethylene glycol ether fatty acid esters (German Patent 3,541,813), for example, have also been disclosed. The thickening action of these additives is presumably due to a highly hydrated lattice build up, resulting in the partial immobilization of water.

A non-urethane thickener is disclosed in U.S. Pat. No. 3,770,684 which teaches latex compositions containing from about 0.1% to about 3.0% of a compound of the general formula R—X- (water soluble polyether)-X—R' wherein R and R' are water insoluble hydrocarbon residues; X is a connecting linkage selected from the group consisting of an ether linkage, an ester linkage, an amide linkage, an imino linkage, a urethane linkage, an sulfide linkage, or a siloxane linkage. U.S. Pat. No. 3,770,684 also teaches that the preferred water soluble polyether is a polyethylene oxide polymer having a molecular weight of from 3,000 to 35,000 or an ethylene oxide-propylene oxide copolymer having a molecular weight of from 3,000 to 35,000.

A common feature of these thickeners is the simultaneous presence of linear or branched polymers which contain hydrophilic segments (e.g., polyether chains containing at least 5 alkylene oxide units, preferably ethylene oxide units), hydrophobic segments (e.g., hydrocarbon segments containing at least 6 carbon atoms) and urethane groups.

Typical thickeners can be categorized into one of the following four categories:

1. Cellulosic thickeners are water-soluble polymers. These thickeners have cellulosic backbones with various molecular weight hydroxyl terminated ethylene oxide chains extending from the backbone. The water-soluble ethylene oxide chains, through hydrogen bonding with the water, swell and increase in molecular weight, resulting in an increase in the viscosity of the paint. Depending on the molecular weight and variation, as well as the number of ethylene oxide groups, the thickener controls the rheology of the paint and influences water sensitivity of the coating. An example of a cellulosic thickener described in the art is xanthan gum, which is a cellulosic composition containing a carboxyl functionality.

2. Hydrophobically modified cellulosic thickeners are water-soluble polymers whereby the cellulosic hydroxyl groups have been modified to contain a hydrophobic moiety. This type of thickener increases viscosity hydrodynamically through hydrogen bonding interactions with water. The hydrophobes associate with other hydrophobic components in the paint composition to form a network to increase its associative molecular weight. U.S. Pat. No. 4,218,262 describes a nonclumping, delayed action viscosity increasing agent comprising core particles of xanthan gum and an encapsulating coating of a fat derivative and a surfactant wherein the coating has a hydrophilic/lipophilic balance (HLB) of from 3.5 to 10. The fat derivative is selected from the group consisting of fatty acids and mono and diglycerides of fatty acids. The surfactant is selected from the group consisting of alkali metal salts of fatty acids. Methods of forming the encapsulated particles are also disclosed. Additionally, U.S. Pat. No. 5,391,359 describes water dispersible thickeners comprising hydrophilic polymers coated with particulate fatty acids or the salts thereof. The composition is a blend of CE (CMC), starches and gums with finely divided particulate dispersant (more preferably from 2% to 20%) such as fatty acid or fatty acid salts (Al, Ca, Mg & Na stereate). Hydrophobic fumed silica was used for comparative purposes.

3. Hydrophobically modified alkali swellable thickeners are polymerized with ethyl-acrylate, methacrylic acid, and a hydrophobe such as a nonyl-phenol. These thickeners thicken through hydrodynamic and associative thickening.

4. Hydrophobically terminated ethoxylated urethane thickeners are relatively smaller molecular weight thickeners consisting of an ethylene oxide chain terminated with a hydrophobe such as octadecyl. Primarily this type of thickener increases viscosity by forming networks with other hydrophobic components, other urethane thickeners, latex particles, and nonionic surfactants. These low molecular weight thickeners can be water soluble depending on the degree of ethoxylation; thus, they can leach from the paint film. U.S. Pat. No. 4,426,485 teaches thickeners for aqueous systems which are water-soluble polymers having a molecular weight of at least 10,000 and which are comprised of hydrophobic segments each containing at least one monovalent hydrophobic group covalently bonded to the polymer. At least one of the hydrophobic segments has at least two hydrophobes thereby forming a bunch of hydrophobes within the hydrophobic segment. The hydrophobes within a bunched hydrophobic segment are in close association when they are separated by no more than about 50 covalently bonded, sequentially connected atoms. One example of such a polymer is made by reacting a polyurethane pre-polymer comprised of PEG 8000 and toluene diisocyanate with toluene diisocyanate and the diol formed by reaction of epichlorohydrin and a 10 mole ethylene oxide adduct of nonyl phenol.

In contrast to latex compositions, oil-based compositions, e.g., oil-based paints, commonly employ vegetable oils such as linseed oil or tung oil and/or vegetable oil co-reacted with other compounds (such as alkyd resins) as a component of the vehicle in the paint. The vegetable oils, which are also referred to in the art as "drying oils", form crosslinked films upon exposure to air. Like all vegetable oils, these drying oils are triesters of various fatty acids and glycerol. However, unlike most vegetable oils, the fatty acids in drying oils have a very high degree of unsaturation (high iodine value), are high in polyunsaturated fatty acids, and generally have a majority of fatty acids that contain 3 or more double bonds (such as linolenic [cis-9-cis-12-cis-15-Octadecatrienoic] acid, eleostearic [cis-9-trans-11-trans-13-Octadecatrienoic] acid, and 4-Oxo-cis-9-trans-11-trans-13-Octadecatrienoic acid). Semi-drying oils have moderate to high degrees of unsaturation, and are high in polyunsaturated fatty acids, but contain lower levels of fatty acids that have 3 or more double bonds. The use of such reactive drying oils in oil based paints helps to provide a paint film which is hard and durable. Thus, the drying oils and co-reacted vegetable oil products (alkyds) are desirable components of oil-based compositions. However, oil based compositions typically comprise large proportions of volatile organic compounds ("VOC's") as solvents or additives, e.g., 380 to 450 grants per liter ("g/l") or more. Such high concentrations of VOC's are environmentally undesirable.

Latex compositions, on the other hand, typically comprise very low concentrations of VOC's, e.g. less than about 250 g/l and thus are more environmentally compatible. Accordingly, it would be desirable to incorporate the drying oils of oil-based compositions into latex compositions to promote crosslinking of the latex compositions. However, the drying oils used in oil-based compositions are not water-soluble and accordingly cannot readily be used in latex compositions.

A latex or emulsion composition containing drying oils is disclosed in U.S. Pat. Nos. 6,203,720 and 6,174,948. The compositions disclosed in these patents contain crosslinkable monomers having a fatty acid residue derived from semi-drying or non-drying oils and chemically attached to ethylenically unsaturated carboxylic acids. The monomers are polymerized to yield a latex polymer resin with oxidative cross-linking capability. These paint and coating formulations are susceptible to the same HLB concerns described herein. The formulations may require typical additives to yield a stable in-can paint formulation. As noted above, the known additives lessen the durability and water-resistance of the dry paint film.

It is desirable to develop a latex paint formulation which incorporates components that can react during the curing process, and thereby help form a durable, water-resistant paint film. It is also desirable to reduce the amounts of the water soluble or water sensitive components which provide emulsifying and rheologic properties in the can but also can contribute to poorer properties of the dry coating. Typically, surfactants, thickeners and dispersants are generally lower molecular weight components that remain in the paint film, which can significantly reduce water resistance and durability of the paint film. These components are required to maintain stability in the aqueous phase for in-can storage, but can compromise the end use function of a paint film. The present invention is directed to a latex paint formulation comprised of unsaturated fatty-acid containing rheologic and emulsifying components capable of oxidative crosslinking during the curing process that yield dried films with improved coating durability and water-resistance. The fatty acid components reduce or eliminate the need for typical water soluble emulsifiers, dispersants and surfactants.

BRIEF SUMMARY OF THE INVENTION

The present invention is directed to a latex paint composition comprising polyunsaturated fatty acid containing additives derived from vegetable oils. In preferred embodiments, traditional water soluble additives such as thickeners, surfactants and dispersants are replaced with polyunsaturated fatty acid derivatives, adducts or polyunsaturated fatty acid containing polymers. The polyunsaturated fatty acid containing additives reduce or eliminate the need for traditional water soluble additives that lower the water resistance of the dry paint film. Additionally, the polyunsaturated fatty acid moieties are capable of oxidative crosslinking during the curing process, forming a dry paint film that is more durable and water-resistant than traditional latex paint compositions.

BRIEF DESCRIPTION OF THE FIGURES

FIG. 3 depicts the stability of latex particle dispersions containing PGME as shown by the gloss and sheen values of the paint formulations.

FIG. 4 depicts the stability of latex particle dispersions containing PGME as shown by the hide values of the paint formulations.

FIG. 5 depicts viscosity data of latex polymer blends with added coalescing aids only [no added thickeners].

DETAILED DESCRIPTION OF THE INVENTION

Figure 1:
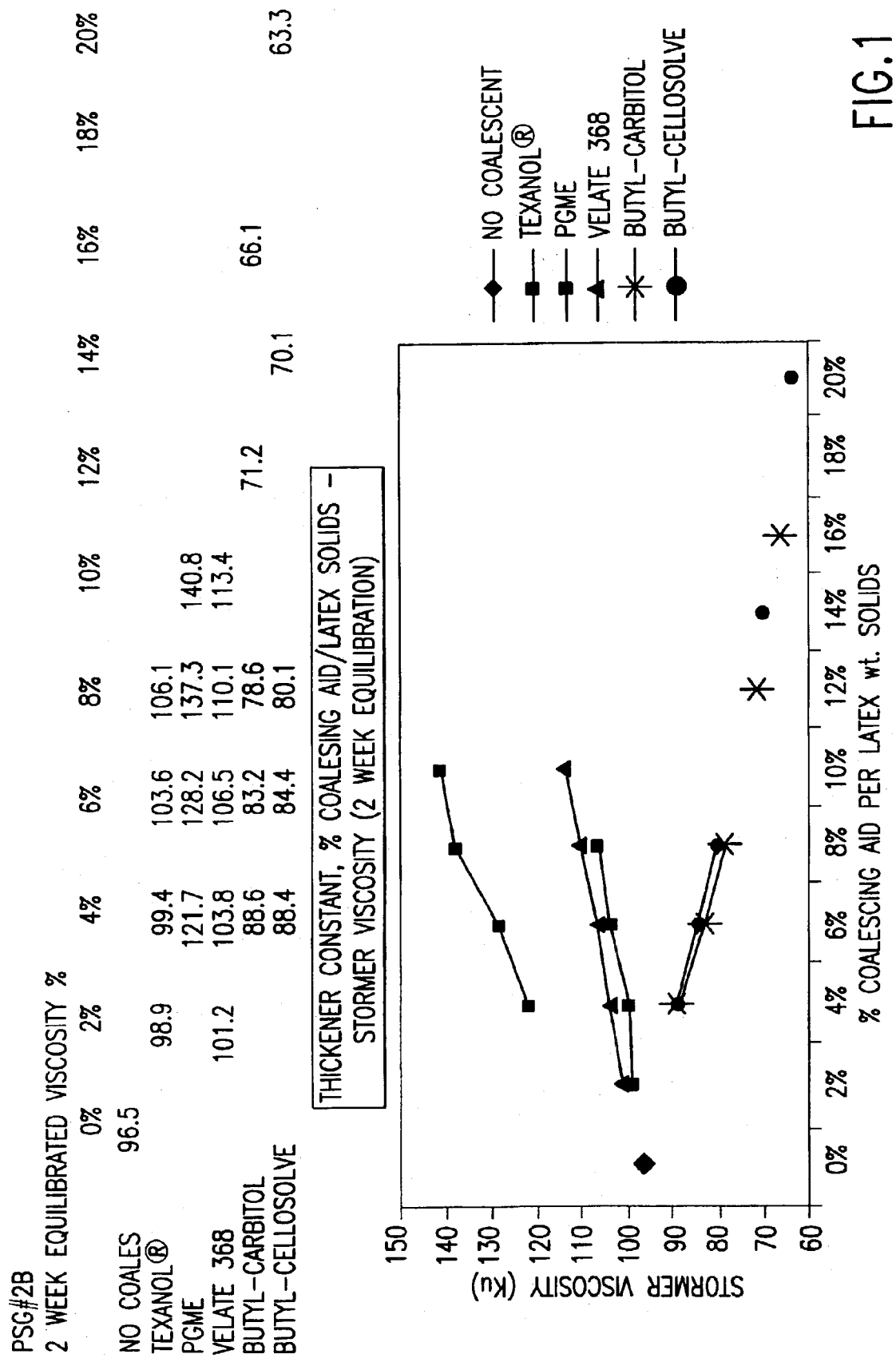
FIG. 1 depicts an increase in viscosity of the PSG#2B paint formulation with increasing levels of unsaturated fatty acid propylene glycol monoesters (PGME) [constant nonionic associative thickener concentration].

The present invention is directed to latex paint compositions comprising additive components derived from polyunsaturated fatty acids. The latex paint composition comprises one or more additive components that contain a polyunsaturated fatty acid derivative, adduct or polyunsaturated fatty acid containing polymer. In one aspect of the present invention, the latex paint composition comprises the following components:

a. a latex polymer, and
b. one or more of the following:
  i. a polyunsaturated fatty acid moiety chemically attached to a water soluble polymer, said polymer being selected from the group consisting of polyethylene glycol, anionic and cellulosic polymers,
  ii a polyunsaturated fatty acid moiety chemically attached to an alcohol, and
  iii. a polyunsaturated fatty acid moiety chemically attached to a glycol or a polyol.

The latex polymer can be any latex polymer resin that is well known in the art for use in paints, coatings and the like. Useful latex polymers comprise addition-type polymers including polymerization and co-polymerization products of: vinyl acetate, acrylic acid, methacrylic acid, styrene, alpha-methyl styrene, butadiene, acrylates, methacrylates, vinyl chloride, vinylidene chloride and acrylonitrile containing monomers. Particularly preferred are polymers and co-polymers of alkyl acrylates, alkyl methacrylates, styrene, and vinyl acetate. In preferred embodiments, the polyunsaturated fatty acid or derivative thereof is derived from a vegetable oil. Methods for obtaining fatty acids from vegetable oils are well known in the art. Preferred vegetable oils include soybean oil, linseed oil, sunflower oil, corn oil, canola oil, rapeseed oil, cottonseed oil, peanut oil, tung oil, perilla oil, oiticica oil, castor oil and safflower oil. Most preferably, the polyunsaturated fatty acid moiety is derived from soybean or linseed oil.

The polyunsaturated fatty acids or derivatives thereof may have been converted to or naturally contain conjugated sites of unsaturation.

If the polymer is polyethylene glycol or polypropylene glycol, at least one terminus of the polymer can be chemically attached through the carboxylic acid group of a polyunsaturated fatty acid or derivative thereof via an ester, ether or urethane linkage. When the functionality is that of a surfactant, the size of the polyethylene glycol chain can vary depending upon the desired level of surface activity.

If the polymer is an anionic polymer, it is preferred that the polymer is comprised of vinyl monomers that includes, at least in part, acrylic acid and/or methacrylic acid, wherein said polyunsaturated fatty acid or derivative thereof is chemically attached to at least one of said monomers comprising said polymer. The chemical attachment is an ester, ether or urethane linkage. The vinyl monomer containing the polyunsaturated fatty acid or derivative thereof is subsequently polymerized to yield a polymer possessing hydrophobic traits from the fatty acid moieties and hydrophilic traits from the anionic polymer backbone.

If the polymer is cellulosic, it is envisioned that the cellulosic backbone can be any cellulosic polymer that contains one or more free hydroxyl groups. Preferred cellulosic polymers are xanthan gum, carboxymethylcellulose, hydroxyethyl cellulose and hydroxypropyl cellulose. The polyunsaturated fatty acid or derivative thereof can be synthetically attached to the cellulosic backbone through the free hydroxyl group via an ester, ether or urethane linkage.

If the latex paint composition contains a polyunsaturated fatty acid or derivative thereof chemically attached to an alcohol, the chemical attachment is through an ester, ether or urethane linkage. In a preferred embodiment, the alcohol is selected from the group consisting of $C_1$–$C_5$ alcohols including methanol, ethanol, 1-propanol, isopropanol or 1-butanol.

If the latex paint composition contains a polyunsaturated fatty acid or derivative thereof chemically attached to a glycol, the chemical attachment is through an ester, ether or urethane linkage. In a preferred embodiment, the glycol is selected from the group consisting of ethylene glycol, diethylene glycol, dipropylene glycol, 1,4-butanediol, propylene glycol and 1,3-propane diol or mixtures thereof. Most preferably, the glycol is ethylene glycol or propylene glycol.

If the latex paint composition contains a polyunsaturated fatty acid or derivative thereof chemically attached to a polyol, the chemical attachment is through an ester, ether or urethane linkage. In a preferred embodiment, the polyol is selected from the group consisting of glycerine, trimethylol propane (TMP) and sorbitol.

Typical drying agents (certain metal soaps and salts) are well known in the art and can be incorporated in the compositions described herein.

Most preferably, the composition contains a plurality of polyunsaturated fatty acid or derivative thereof containing additives, each of which contribute as described herein to the curing process to produce a more durable, water-resistant coating compared to traditional latex paints. In this embodiment, the present invention is directed to a latex paint composition comprising:

1. a latex polymer,
2. a thickener comprised of a polyunsaturated fatty acid moiety chemically attached to a polymer, wherein said polymer is selected from the group consisting of polyethylene glycol, cellulosic and anionic polymers,
3. a surfactant comprised of a polyunsaturated fatty acid moiety chemically attached to one of the following:
   a. a polyethylene glycol,
   b. an alcohol or
   c. a polyol, and
4. a dispersant comprised of a polyunsaturated fatty acid moiety chemically attached to a glycol, wherein said dispersant contains a free hydroxyl or a carboxyl group.

In this embodiment of the invention, the latex polymer can be any latex polymer resin that is well known in the art for use in paints, coatings and the like. It is preferred that the polyunsaturated fatty acid or derivative thereof is derived from a vegetable oil. Preferred vegetable oils include soybean oil, linseed oil, sunflower oil, corn oil, canola oil, rapeseed oil, cottonseed oil, peanut oil, tung oil, perilla oil, castor oil, oiticica oil and safflower oil. Most preferably, the polyunsaturated fatty acid moiety is derived from soybean or linseed oil.

The polyunsaturated fatty acid or derivative thereof may contain conjugated sites of unsaturation.

It is preferable that the thickener is comprised of at least one polyunsaturated fatty acid or derivative thereof that is chemically attached to a polymer, wherein the polymer is a polyethylene glycol, cellulosic or anionic polymer. If the thickener is comprised of a polymer of polyethylene glycol, at least one terminus of the polymer is chemically attached to a polyunsaturated fatty acid or derivative thereof. The chemical attachment is an ester, ether or urethane linkage. If the thickener is comprised of an anionic polymer, it is preferred that the polymer is comprised of vinyl monomers, wherein at least one of the vinyl monomer is chemically attached to a polyunsaturated fatty acid or derivative thereof. The chemical attachment is an ester, ether or urethane linkage. The vinyl monomer containing the polyunsaturated fatty acid or derivative thereof is subsequently polymerized to yield a polymer possessing hydrophobic traits from the fatty acid moieties and hydrophilic traits from the anionic polymer backbone. If the thickener is comprised of a cellulosic polymer, it is envisioned that the cellulosic backbone can be any cellulosic polymer that contains one or more free hydroxyl groups. Preferred cellulosic polymers are xanthan gum, hydroxyethyl cellulose, hydroxypropyl cellulose, and carboxymethylcellulose. The polyunsaturated fatty acid or derivative thereof can be synthetically attached to the cellulosic backbone through the free hydroxyl group via an ester, ether or urethane linkage.

If the surfactant is comprised of a polyunsaturated fatty acid or derivative thereof and a polyethylene glycol, the polymer can be chemically attached through the carboxylic acid group of a polyunsaturated fatty acid or derivatives thereof via an ester, ether or urethane linkage. The size of the polyethylene glycol chain can vary depending upon the desired level of surface activity. If the surfactant is comprised of a polyunsaturated fatty acid or derivative thereof and an alcohol, the alcohol is selected from the group consisting of $C_1$–$C_5$ alcohols including methanol, ethanol, 1-propanol, isopropanol or 1-butanol. More preferably, the alcohol is methanol or ethanol. The fatty acid or derivative thereof is chemically attached to the alcohol through an ester, ether or urethane linkage. If the surfactant contains a polyunsaturated fatty acid or derivative thereof chemically attached to a glycol, the chemical attachment is through an ester, ether or urethane linkage. In a preferred embodiment, the glycol is selected from the group consisting of ethylene glycol, diethylene glycol, 1,4-butanediol, propylene glycol and 1,3-propane diol. Most preferably, the glycol contains a free hydroxyl or carboxyl group. If the surfactant contains a polyunsaturated fatty acid or derivative thereof chemically attached to a polyol, the chemical attachment is through an ester, ether or urethane linkage. In a preferred embodiment, the polyol is selected from the group consisting of glycerine, trimethylol propane (TMP) and sorbitol.

In this aspect of the invention, a dispersant comprises a polyunsaturated fatty acid or derivative thereof that contains one or more of the following groups on the glycol: a free hydroxyl group or a free carboxyl group. More preferably the polyunsaturated fatty acid or derivative thereof is a polyunsaturated fatty acid mono-ester of a glycol The term "polyunsaturated fatty acid or derivative thereof" as used herein refers to a polyunsaturated fatty acid moiety or an ester, ether, carbamate or amide derived from said polyunsaturated fatty acid moiety. Examples of a polyunsaturated fatty acid or a derivative thereof include polyunsaturated fatty acid mono-esters of glycols, such as linoleic acid mono-ester of ethylene glycol and linolenic acid mono-ester of propylene glycol.

The polyunsaturated fatty acid or derivative thereof can be derived from a vegetable oil, genetically modified vegetable oil, or chemically or enzymatically modified vegetable oil. The term "genetically modified vegetable oil" refers to an oil derived from a crop source that contains any gene alteration produced through genetic engineering techniques. Chemical or enzymatic modifications comprise any alteration of the physical or chemical properties of an oil, such as level of saturation, conjugation, or epoxidation.

Specifically, polyunsaturated fatty acids derived from vegetable oils can be used as a hydrophobe in formulation a latex paint composition. A polyunsaturated fatty acid contains a carbon chain typically 12 to 20 carbons in length, with a carboxylic acid end-group. A polyunsaturated fatty acid is hydrophobic due to the length of the carbon chain, which may contain conjugated or non-conjugated sites of unsaturation.

Polyunsaturated fatty acids or derivatives thereof possess three properties of a hydrophobe component raw material for use in an aqueous coating formulation. First, the polyunsaturated fatty acid derivative by virtue of its hydrophobicity behaves as a nonionic surfactant, and improves water resistance.

The efficiency of the polyunsaturated fatty acid or derivative thereof in this respect is relative to generally used hydrophobes of compositions such as octyl-phenols and nonyl-phenols. Second, the fatty acids or derivatives thereof obtained from linseed oil and soy oils (and other unsaturated vegetable oils) contain unsaturated carbon bonds capable or further chemical reaction. These polyunsaturated fatty acid compositions, alone or synthetically combined with surfactants or thickeners functions similarly to typical hydrophobes in the dispersion, suspension, and stability of the aqueous paint. When applied as part of a coating on a substrate, the polyunsaturated fatty acid moieties could react, increasing the film hydrophobicity, water resistance, and film durability. Typical commercial hydrophobes such as nonylphenol do not contain sites of unsaturation. Thus, typical hydrophobes retain their initial molecular weight, and are relatively water-soluble or water-leachable components that detract from paint film performance. Third, polyunsaturated fatty acid glycol esters possess an affinity for metal surfaces due to a hydrophilic terminus. It would be expected that the carboxylic acid glycol ester terminus of a polyunsaturated fatty acid would display affinity for pigments which contain high-energy inorganic surfaces similar to metals. Essentially the polyunsaturated fatty acid derivative would act much like a dispersant. The affinity of the polyunsaturated fatty acid glycol ester towards metal should also improve adhesion of the paint film on alkyd or metal surfaces. Comparable or improved gloss and hide of the dry paint film versus paint compositions containing commercial dispersants would demonstrate optimum particle dispersion.

These polyunsaturated fatty acids are hydrophobes and would function similarly to typical commercial hydrophobes such as octyl-phenols and nonyl-phenols. The polyunsaturated fatty acid hydrophobes would have the added benefit of containing reactive sites through their unsaturation. When these polyunsaturated fatty acid hydrophobes are incorporated into the structures of associative thickeners, dispersants and surfactants used in latex paints, these reactive hydrophobes would yield chemically labile sites. These sites would be available for further reaction within the latex paint improving the properties and functionality of the coating.

EXAMPLES

Example 1

A study was initiated to evaluate the properties of propylene glycol mono-esters of polyunsaturated fatty acid (PGME) derived from soy oil in a latex paint formulation. A semi-gloss paint using a vinyl-acrylic copolymer (82%) and an acrylic copolymer at 18% ol total latex solids was used to evaluate the fatty acid ester. Tables 1–6 depict paint formulations, PSG#2B and PSG#2C.

Figure 2:
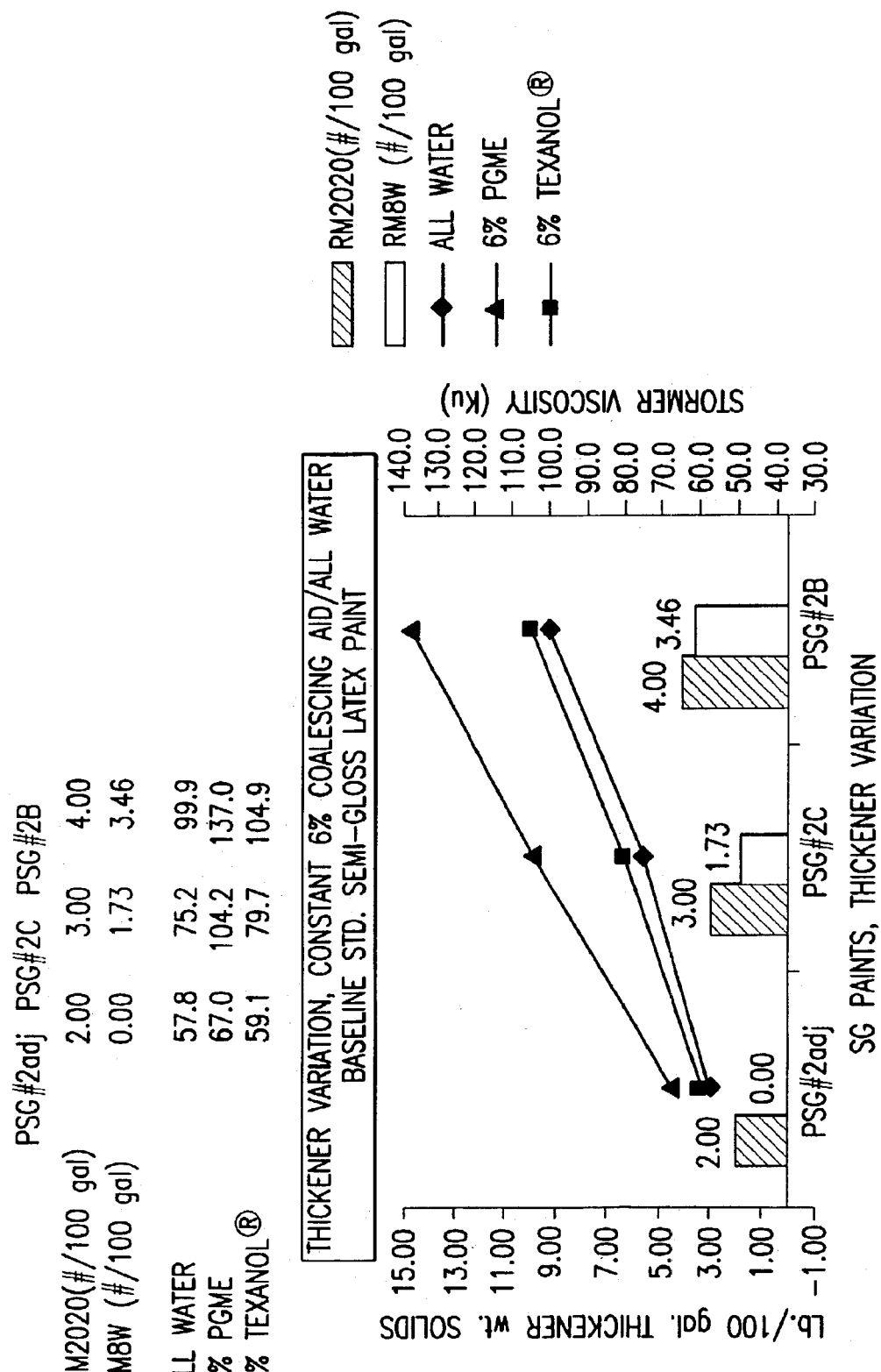
FIG. 2 depicts an increase in viscosity of paint formulations containing increasing levels of added of nonionic associative thickeners [constant concentration of either PGME or Texanol®].

The difference in the PSG#2B and PSG#2C formulations is in the amount of associative nonionic polyurethane thickeners. The polyunsaturated fatty acid propylene glycol ester (PGME) was added to the paint as a coalescing aid versus a commercial coalescing aids, e.g. Texanol®, on a percent latex weight solids basis (lbs./100 gallons). Data for PSG#2B paint formulation (FIG. 1) demonstrate the fatty acid ester (PGME) substantially increases Stormer viscosity (krebs units) versus commercial coalescing aids indicating substantial thickener properties in paints containing conventional non-ionic, associative thickeners. Typical paint viscosity increases due to emulsion particle swelling are indicated by the major commercial coalescing solvent, Texanol®. The thickening effect was further evaluated (FIG. 2) by reducing the associative nonionic polyurethane thickener (PSG#2C paint Formula) to obtain comparable viscosity. The 60 degree gloss and 85 degree sheen values (FIG. 3) demonstrate the polyunsaturated fatty acid ester maintains optimum latex particle dispersion, inhibiting particle flocculation or coagulation that would result in destabilizing particles, loss of gloss, and increases in viscosity. Hiding values (FIG. 4) are comparable to controls indicating pigment stability in the formulation rather than flocculation and agglomeration destabilization, which could cause viscosity increases. Thus, incorporation of PGME into latex paint formulations provided thickening of the paint in conjunction with the associative nonionic thickener. This thickening due to PGME allowed for reduction of the conventional associative thickener in the paint formulation while maintaining the original desired viscosity.

TABLE 1

Semi-Gloss Latex Interior Wall Paint

| Specs. Code | Name | Pounds NVM | Gallons NVM | Water LBS. | VOC LBS. | Total Liters | VOC grms/ltr |
|---|---|---|---|---|---|---|---|
| D1 | Dispersion: Grind | | | | | | |
| S-1-W | Water | 0.00 | 0.00 | 100.00 | 0.00 | 45.50 | 0.00 |
| BIO-95 | NUOSEPT 95 Preservative | 1.00 | 0.09 | 1.00 | 0.00 | 0.80 | 0.00 |
| C16 | SLOW SPEED | | | | | | |
| T-40-AC | Attagel-40 | 4.00 | 0.20 | 0.00 | 0.00 | 0.77 | 0.00 |
| T-330-HEC | HERCULES WSP D-330 | 2.00 | 0.20 | 0.00 | 0.00 | 0.76 | 0.00 |
| C17 | MEDIUM SPEED | | | | | | |
| C27 | MIX MIN. | | | | | | |
| DF-475-MO | L-475 DREW DEFOAMER | 2.00 | 0.26 | 0.00 | 0.00 | 1.00 | 0.00 |
| C18 | FAST SPEED | | | | | | |
| 00–684 | GRIND 20 MIN | 0.00 | 0.00 | 0.00 | 0.00 | 0.00 | #DIV/01 |
| C17 | MEDIUM SPEED | | | | | | |
| D-95-P | Strodex PK-95G | 1.62 | 0.16 | 0.30 | 0.08 | 0.79 | 55.45 |
| NI-9-NP | Tergitol NP-9 | 2.00 | 0.23 | 0.00 | 0.00 | 0.86 | 0.00 |
| B-95-AMN | AMP-95 | 0.00 | 0.00 | 0.11 | 2.09 | 1.06 | 937.40 |
| DF-475-M | L-475 DREW DEFOAMER | 2.00 | 0.26 | 0.00 | 0.00 | 1.00 | 0.00 |
| C27 | MIX MIN. | | | | | | |
| C16 | SLOWSPEED | | | | | | |
| C15 | CHECK GRIND | | | | | | |
| C23 | END | | | | | | |
| 00–000 | Grind Total: | | | | | | |
| T1 | Thindown Mix | | | | | | |
| S-1-W | Water | 0.00 | 0.00 | 51.58 | 0.00 | 23.47 | 0.00 |
| S-1-G | Propylene Glycol | 0.00 | 0.00 | 0.00 | 30.21 | 13.27 | 1033.76 |
| C16 | SLOW SPEED | | | | | | |
| T-2020-PU | ACRYSOL RM-2020NPR | 3.00 | 0.28 | 12.00 | 0.00 | 6.53 | 0.00 |
| T-8-PU | ACRYSOL RM-8W | 1.73 | 0.10 | 8.14 | 0.00 | 4.08 | 0.00 |
| D-5-SS | TRITON GR-SM Anionic | 0.30 | 0.02 | 0.10 | 0.10 | 0.22 | 258.10 |
| C17 | MEDIUM SPEED | | | | | | |
| C27 | MIX 10 MIN. | | | | | | |
| C11 | ADD DISPERSION | | | | | | |
| C27 | MIX 10 MIN. | | | | | | |

TABLE 1-continued

Semi-Gloss Latex Interior Wall Paint

| Specs. Code | Name | Pounds NVM | Gallons NVM | Water LBS. | VOC LBS. | Total Liters | VOC grms/ltr |
|---|---|---|---|---|---|---|---|
| L-9100-VA | Rovace 9100 Latex Co-Po | 182.04 | 18.49 | 148.94 | 0.00 | 137.85 | 0.00 |
| L-6030-A | Ucar 6030 Acrylic Latex C | 39.96 | 4.21 | 50.86 | 0.00 | 39.11 | 0.00 |
| C27 | MIX 10 MIN. | | | | | | |
| P-942-TIO | R-942 Gloss TIO 2 Slurry | 250.00 | 7.63 | 76.80 | 0.00 | 63.84 | 0.00 |
| C27 | MIX 10 MIN. | | | | | | |
| DF-475-M | L-475 DREW DEFOAMER | 2.00 | 0.26 | 0.00 | 0.00 | 1.00 | 0.00 |
| C27 | MIX MIN. | | | | | | |
| C23 | END | | | | | | |
| C12 | USE AS NEEDED | | | | | | |
| T-8-PU | ACRYSOL RM-8W | 0.00 | 0.00 | 0.00 | 0.00 | 0.00 | 0.00 |
| S-1-W | Water | 0.00 | 0.00 | 27.16 | 0.00 | 12.36 | 0.00 |
| C35 | Hold Next Items | | | | | | |
| S-1-W | Water | 0.00 | 0.00 | 35.60 | 0.00 | 16.20 | 0.00 |
| 32–121 | Texanol | 0.00 | 0.00 | 0.00 | 17.80 | 8.52 | 947.95 |
| 00–000 | Letdown Total: | 493.65 | 32.41 | 512.59 | 50.28 | 378.99 | |

TABLE 2

Semi-Gloss Latex Interior Wall Paint

| Specs Code | | Name | WPG | PnvmW % wt | BnvmW % wt | PnvmW % vol | BnvmW % vol | Water % wt | Cost per LB | Form. Cost | VOC % wt |
|---|---|---|---|---|---|---|---|---|---|---|---|
| D1 | | Dispersion: Grind | 8.330 | 0.0000 | 0.0000 | 0.0000 | 0.0000 | 1.0000 | 0.0000 | 0.00 | ##### |
| S-1-W | G | Water | 9.496 | 0.0000 | 0.5000 | 0.0000 | 0.4300 | 0.5000 | 0.0000 | 0.00 | ##### |
| BIO-95 | G | NUOSEPT 95 Preservative | | | | | | | | | |
| C16 | | SLOW SPEED | 19.660 | 1.0000 | 0.0000 | 1.0000 | 0.0000 | 0.0000 | 0.0000 | 0.00 | ##### |
| T-40-AC | | Attagel-40 | 10.000 | 0.0000 | 1.0000 | 0.0000 | 1.0000 | 0.0000 | 0.0000 | 0.00 | ##### |
| T-330-HEC | | HERCULES WSP D-330 | | | | | | | | | |
| C17 | | MEDIUM SPEED | | | | | | | | | |
| C27 | | MIX MIN. | | | | | | | | | |
| DF-475-MO | G | L-475 DREW DEFOAMER | 7.600 | 0.1000 | 0.9000 | 0.0345 | 0.9655 | 0.0000 | 0.0000 | 0.00 | ##### |
| C18 | | FAST SPEED | | | | | | | | | |
| C36 | | GRIND 20 MIN | 0.000 | 0.0000 | 0.0000 | 0.0000 | 0.0000 | 0.0000 | 0.0000 | 0.00 | ##### |
| C17 | | MEDIUM SPEED | | | | | | | | | |
| D-95-P | G | Strodex PK-95G | 9.580 | 0.0000 | 0.8100 | 0.0000 | 0.7730 | 0.1500 | 0.0000 | 0.00 | ##### |
| NI-9-NP | G | Tergitol NP-9 | 8.800 | 0.0000 | 1.0000 | 0.0000 | 1.0000 | 0.0000 | 0.0000 | 0.00 | ##### |
| B-95-AMN | G | AMP-95 | 7.850 | 0.0000 | 0.0000 | 0.0000 | 0.0000 | 0.0500 | 0.0000 | 0.00 | ##### |
| DF-475-MO | G | L-475 DREW DEFOAMER | 7.600 | 0.1000 | 0.9000 | 0.0345 | 0.9655 | 0.0000 | 0.0000 | 0.00 | ##### |
| C27 | | MIX MIN. | | | | | | | | | |
| C16 | | SLOW SPEED | | | | | | | | | |
| C15 | | CHECK GRIND | | | | | | | | | |
| C23 | | END | | | | | | | | | |
| 00–000 | | Grind Total: | | | | | | | | | |
| T1 | | Thindown Mix | | | | | | | | | |
| S-1-W | G | Water | 8.330 | 0.0000 | 0.0000 | 0.0000 | 0.0000 | 1.0000 | 0.0000 | 0.00 | ##### |
| S-1-G | G | Propylene Glycol | 8.630 | 0.0000 | 0.0000 | 0.0000 | 0.0000 | 0.0000 | 0.0000 | 0.00 | ##### |
| C16 | | SLOW SPEED | | | | | | | | | |
| T-2020-PU | G | ACRYSOL RM-2020NPR | 8.700 | 0.0000 | 0.2000 | 0.0000 | 0.1645 | 0.8000 | 0.0000 | 0.00 | ##### |
| T-8-PU | G | ACRYSOL RM-8W | 9.163 | 0.0000 | 0.1750 | 0.0000 | 0.0925 | 0.8250 | 0.0000 | 0.00 | ##### |
| D-5-SS | G | TRITON GR-5M Anionic | 8.563 | 0.0000 | 0.6000 | 0.0000 | 0.4036 | 0.2000 | 0.0000 | 0.00 | ##### |
| C17 | | MEDIUM SPEED | | | | | | | | | |
| C27 | | MIX 10 MIN. | | | | | | | | | |
| C11 | | ADD DISPERSION | | | | | | | | | |
| C27 | | MIX 10 MIN. | | | | | | | | | |
| L-9100-VA | G | Rovace 9100 Latex Co-Po | 9.100 | 0.0000 | 0.5500 | 0.0000 | 0.5084 | 0.4500 | 0.0000 | 0.00 | ##### |
| L-6030-A | G | Ucar 6030 Acrylic Latex C | 8.800 | 0.0000 | 0.4400 | 0.0000 | 0.4084 | 0.5600 | 0.0000 | 0.00 | ##### |
| C27 | | MIX 10 MIN. | | | | | | | | | |
| P-942-TIO | G | R-942 Gloss TIO 2 Slurry | 19.400 | 0.7850 | 0.0000 | 0.4527 | 0.0000 | 0.2350 | 0.0000 | 0.00 | ##### |
| C27 | | MIX 10 MIN. | | | | | | | | | |
| DF-475-MO | G | 1-475 DREW DEFOAMER | 7.600 | 0.1000 | 0.9000 | 0.0345 | 0.9655 | 0.0000 | 0.0000 | 0.00 | ##### |
| C27 | | MIX MIN. | | | | | | | | | |
| C23 | | END | | | | | | | | | |
| C12 | | USE AS NEEDED | | | | | | | | | |
| T-8-PU | G | ACRYSOL RM-8W | 9.163 | 0.0000 | 0.1750 | 0.0000 | 0.0925 | 0.8250 | 0.0000 | 0.00 | ##### |
| S-1-W | G | Water | 8.330 | 0.0000 | 0.0000 | 0.0000 | 0.0000 | 1.0000 | 0.0000 | 0.00 | ##### |
| C35 | | Hold Next Items | | | | | | | | | |

TABLE 2-continued

Semi-Gloss Latex Interior Wall Paint

| Specs Code | Name | WPG | PnvmW % wt | BnvmW % wt | PnvmW % vol | BnvmW % vol | Water % wt | Cost per LB | Form. Cost | VOC % wt |
|---|---|---|---|---|---|---|---|---|---|---|
| S-1-W | G Water | 8.330 | 0.0000 | 0.0000 | 0.0000 | 0.0000 | 1.0000 | 0.0000 | 0.00 | ##### |
| CS-2-EA | G Texanol | 7.914 | 0.0000 | 0.0000 | 0.0000 | 0.0000 | 0.0000 | 0.0000 | 0.00 | ##### |
| 00–000 | Letdown Total: | | | | | | | | 0.00 | |

TABLE 3

| Version # | #2C | Batch size 4.80 |  |
|---|---|---|---|
| Code No. | 50/50 PSG #2B & #2Badj | | |
| Trade Name/Color | Semi-Gloss Latex Interior Wall Paint | 100 Gallon | |
| Description | Pastel Base | | |
| Reason for Change | Reduced RM8W&RM2020 | LBS. | GAL. |
| D1 | Dispersion: Grind | | |
| S-1-W | Water | 100.00 | 12.00 |
| BIO-95 | NUOSEPT 95 Preservative | 2.00 | 0.21 |
| C16 | SLOW SPEED | | |
| T-40-AC | Attagel-40 | 4.00 | 0.20 |
| T-330-HEC | HERCULES WSP D-330 | 2.00 | 0.20 |
| C17 | MEDIUM SPEED | | |
| C27 | MIX MIN. | | |
| DF-475-MO | L-475 DREW DEFOAMER | 2.00 | 0.26 |
| C18 | FAST SPEED | | |
| 00-684 | GRIND 20 MIN | | |
| C17 | MEDIUM SPEED | | |
| D-95-P | Strodex PK-95G | 2.00 | 0.21 |
| NI-9-NP | Tergitol NP-9 | 2.00 | 0.23 |
| B-95-AMN | AMP-95 | 2.20 | 0.28 |
| DF-475-M | L-475 DREW DEFOAMER | 2.00 | 0.26 |
| C27 | MIX MIN. | | |
| C16 | SLOW SPEED | | |
| C15 | CHECK GRIND | | |
| C23 | END | | |
| 00-000 | Grind Total: | 118.20 | 13.86 |
| T1 | Thindown Mix | | |
| S-1-W | Water | 51.58 | 6.19 |
| S-1-G | Propylene Glycol | 30.21 | 3.50 |
| C16 | SLOW SPEED | | |
| T-2020-PU | ACRYSOL RM-2020NPR | 15.00 | 1.72 |
| T-8-PU | ACRYSOL RM-8W | 9.87 | 1.98 |
| D-5-SS | TRITON GR-5M Anionic | 0.50 | 0.06 |
| C17 | MEDIUM SPEED | | |
| C27 | MIX 10 MIN. | | |
| C11 | ADD DISPERSION | | |
| C27 | MIX 10 MIN. | | |
| L-9100-VA | Rovace 9100 Latex Co-Polymer | 330.98 | 36.37 |
| L-6030-A | Ucar 6030 Acrylic Latex Co-Polymer | 90.82 | 10.32 |
| C27 | MIX 10 MIN. | | |
| P-942-TIO | R-942 Gloss TIO 2 Slurry | 326.80 | 16.85 |
| C27 | MIX 10 MIN. | | |
| DF-475-MO | L-475 DREW DEFOAMER | 2.00 | 0.26 |
| C27 | MIX MIN. | | |
| C23 | END | | |
| C12 | USE AS NEEDED | | |
| T-8-PU | ACRYSOL RM-8W | 0.00 | 0.00 |
| S-1-W | Water | 27.16 | 3.26 |
| C35 | ----- Hold Next Items | | |
| S-1-W | Water | 35.60 | 4.27 |
| 32-121 | Texanol | 17.80 | 2.25 |
| 00-000 | Letdown Total | 938.32 | 86.14 |
| | Total: | 1056.52 | 100.00 |
| Viscosity (Ku): | 90–96 | VOC (grm/L) | 156.06 Vis |
| pH: | 8.0–9.0 | RMC: | $0.00 |
| 60° Gloss: | 40–55 | PVC: | 24.24 |
| 85 Sheen: | | WPG: | 10.57 |
| STD. Refl. (X) = | | | % WT / % VOL |
| STD. Refl. (Y) = | | Pigment | 24.10 / 7.86 |
| STD. Refl. (Z) = | | Binder | 22.63 / 24.39 |
| Contrast Ratio: | | Total | 46.72 / 32.41 |

TABLE 4

Semi-Gloss Latex Interior Wall Paint

| Specs. Code | Name | Pounds NVM | Gallons NVM | Water LBS. | VOC LBS. | Total Liters | VOC grms/ltr |
|---|---|---|---|---|---|---|---|
| D1 | Dispersion: Grind | | | | | | |
| S-1-W | Water | 0.00 | 0.00 | 100.00 | 0.00 | 45.50 | 0.00 |
| BIO-95 | NUOSEPT 95 Preservative | 1.00 | 0.09 | 1.00 | 0.00 | 0.80 | 0.00 |
| C16 | SLOW SPEED | | | | | | |
| T-40-AC | Attagel-40 | 4.00 | 0.20 | 0.00 | 0.00 | 0.77 | 0.00 |
| T-330-HEC | HERCULES WSP D-330 | 2.00 | 0.20 | 0.00 | 0.00 | 0.76 | 0.00 |
| C17 | MEDIUM SPEED | | | | | | |
| C27 | MIX MIN. | | | | | | |
| DF-475-MO | L-475 DREW DEFOAMER | 2.00 | 0.26 | 0.00 | 0.00 | 1.00 | 0.00 |

TABLE 4-continued

Semi-Gloss Latex Interior Wall Paint

| Specs. Code | Name | Pounds NVM | Gallons NVM | Water LBS. | VOC LBS. | Total Liters | VOC grms/ltr |
|---|---|---|---|---|---|---|---|
| C18 | FAST SPEED | | | | | | |
| 00–684 | GRIND 20 MIN | 0.00 | 0.00 | 0.00 | 0.00 | 0.00 | #DIV/01 |
| C17 | MEDIUM SPEED | | | | | | |
| D-95-P | Strodex PK-95G | 1.62 | 0.16 | 0.30 | 0.08 | 0.79 | 55.45 |
| NI-9-NP | Tergitol NP-9 | 2.00 | 0.23 | 0.00 | 0.00 | 0.86 | 0.00 |
| B-95-AMN | AMP-95 | 0.00 | 0.00 | 0.11 | 2.09 | 1.06 | 937.40 |
| DF-475-MO | L-475 DREW DEFOAMER | 2.00 | 0.26 | 0.00 | 0.00 | 1.00 | 0.00 |
| C27 | MIX MIN. | | | | | | |
| C16 | SLOW SPEED | | | | | | |
| C15 | CHECK GRIND | | | | | | |
| C23 | END | | | | | | |
| 00–000 | Grind Total: | | | | | | |
| T1 | Thindown Mix | | | | | | |
| S-1-W | Water | 0.00 | 0.00 | 51.58 | 0.00 | 23.47 | 0.00 |
| S-1-G | Propylene Glycol | 0.00 | 0.00 | 0.00 | 30.21 | 13.27 | 1033.76 |
| C16 | SLOW SPEED | | | | | | |
| T-2020-PL | ACRYSOL RM-2020NPR | 4.00 | 0.38 | 16.00 | 0.00 | 8.71 | 0.00 |
| T-8-PU | ACRYSOL RM-8W | 3.00 | 0.17 | 14.14 | 0.00 | 7.09 | 0.00 |
| D-5-SS | TRITON GR-5M Anionic | 0.30 | 0.02 | 0.10 | 0.10 | 0.22 | 258.10 |
| C17 | MEDIUM SPEED | | | | | | |
| C27 | MIX 10 MIN. | | | | | | |
| C11 | ADD DISPERSION | | | | | | |
| C27 | MIX 10 MIN. | | | | | | |
| L-9100-VA | Rovace 9100 Latex Co-Po | 182.04 | 18.49 | 148.94 | 0.00 | 137.85 | 0.00 |
| L-6030-A | Ucar 6030 Acrylic Latex C | 39.96 | 4.21 | 50.86 | 0.00 | 39.11 | 0.00 |
| C27 | MIX 10 MIN. | | | | | | |
| P-942-TIO | R-942 Gloss TIO 2 Slurry | 250.00 | 7.63 | 76.80 | 0.00 | 63.84 | 0.00 |
| C27 | MIX 10 MIN. | | | | | | |
| DF-475-MO | L-475 DREW DEFOAMER | 2.00 | 0.26 | 0.00 | 0.00 | 1.00 | 0.00 |
| C27 | MIX MIN. | | | | | | |
| C23 | END | | | | | | |
| C12 | USE AS NEEDED | | | | | | |
| T-8-PU | ACRYSOL RM-8W | 0.46 | 0.03 | 2.15 | 0.00 | 1.08 | 0.00 |
| S-1-W | Water | 0.00 | 0.00 | 13.42 | 0.00 | 6.11 | 0.00 |
| C35 | Hold Next Items | | | | | | |
| S-1-W | Water | 0.00 | 0.00 | 35.60 | 0.00 | 16.20 | 0.00 |
| 32–121 | Texanol | 0.00 | 0.00 | 0.00 | 17.80 | 8.52 | 947.95 |
| 00–000 | Letdown Total: | 496.38 | 32.61 | 510.99 | 50.28 | 379.00 | |

TABLE 5

Semi-Gloss Latex Interior Wall Paint

| Specs Code | | Name | WPG | PnvmW % wt | BnvmW % wt | PnvmW % vol | BnvmW % vol | Water % wt | Cost per LB | Form. Cost | VOC % wt |
|---|---|---|---|---|---|---|---|---|---|---|---|
| D1 | | Dispersion: Grind | | | | | | | | | |
| S-1-W | G | Water | 8.330 | 0.0000 | 0.0000 | 0.0000 | 0.0000 | 1.0000 | 0.0000 | 0.00 | ##### |
| BIO-95 | G | NUOSEPT 95 Preservative | | | | | | | | | |
| C16 | | SLOW SPEED | 9.496 | 0.0000 | 0.5000 | 0.0000 | 0.4300 | 0.5000 | 0.0000 | 0.00 | ##### |
| T-40-AC | | Attagel-40 | 19.660 | 1.0000 | 0.0000 | 1.0000 | 0.0000 | 0.0000 | 0.0000 | 0.00 | ##### |
| T-330-HEC | | HERCULES WSP D-330 | 10.000 | 0.0000 | 1.0000 | 0.0000 | 1.0000 | 0.0000 | 0.0000 | 0.00 | ##### |
| C17 | | MEDIUM SPEED | | | | | | | | | |
| C27 | | MIX MIN. | | | | | | | | | |
| DF-475-MO | G | L-475 DREW DEFOAMER | 7.600 | 0.1000 | 0.9000 | 0.0345 | 0.9655 | 0.0000 | 0.0000 | 0.00 | ##### |
| C18 | | FAST SPEED | | | | | | | | | |
| 00–684 | | GRIND 20 MIN | 0.000 | 0.0000 | 0.0000 | 0.0000 | 0.0000 | 0.0000 | 0.0000 | 0.00 | ##### |
| C17 | | MEDIUM SPEED | | | | | | | | | |
| D-95-P | G | Strodex PK-95G | 9.580 | 0.0000 | 0.8100 | 0.0000 | 0.7730 | 0.1500 | 0.0000 | 0.00 | ##### |
| NI-9-NP | G | Tergitol NP-9 | 8.800 | 0.0000 | 1.0000 | 0.0000 | 1.0000 | 0.0000 | 0.0000 | 0.00 | ##### |
| B-95-AMN | G | AMP-95 | 7.850 | 0.0000 | 0.0000 | 0.0000 | 0.0000 | 0.0500 | 0.0000 | 0.00 | ##### |
| DF-475-M | G | L-475 DREW DEFOAMER | 7.600 | 0.1000 | 0.9000 | 0.0345 | 0.9655 | 0.0000 | 0.0000 | 0.00 | ##### |
| C27 | | MIX MIN. | | | | | | | | | |
| C16 | | SLOW SPEED | | | | | | | | | |
| C15 | | CHECK GRIND | | | | | | | | | |
| C23 | | END | | | | | | | | | |
| 00–000 | | Grind Total: | | | | | | | | | |
| T1 | | Thindown Mix | | | | | | | | | |
| S-1-W | G | Water | 8.330 | 0.0000 | 0.0000 | 0.0000 | 0.0000 | 1.0000 | 0.0000 | 0.00 | ##### |
| S-1-G | G | Propylene Glycol | 8.630 | 0.0000 | 0.0000 | 0.0000 | 0.0000 | 0.0000 | 0.0000 | 0.00 | ##### |

TABLE 5-continued

Semi-Gloss Latex Interior Wall Paint

| Specs Code | Name | | WPG | PnvmW % wt | BnvmW % wt | PnvmW % vol | BnvmW % vol | Water % wt | Cost per LB | Form. Cost | VOC % wt |
|---|---|---|---|---|---|---|---|---|---|---|---|
| C16 | SLOW SPEED | | | | | | | | | | |
| T-2020-PU | ACRYSOL RM-2020NPR | G | 8.700 | 0.0000 | 0.2000 | 0.0000 | 0.1645 | 0.8000 | 0.0000 | 0.00 | ##### |
| T-8-PU | ACRYSOL RM-8W | G | 9.163 | 0.0000 | 0.1750 | 0.0000 | 0.0925 | 0.8250 | 0.0000 | 0.00 | ##### |
| D-5-SS | TRITON GR-5M Anionic | G | 8.563 | 0.0000 | 0.6000 | 0.0000 | 0.4036 | 0.2000 | 0.0000 | 0.00 | ##### |
| C17 | MEDIUM SPEED | | | | | | | | | | |
| C27 | MIX 10 MIN. | | | | | | | | | | |
| C11 | ADD DISPERSION | | | | | | | | | | |
| C27 | MIX 10 MIN. | | | | | | | | | | |
| L-9100-VA | Rovace 9100 Latex Co-Po | G | 9.100 | 0.0000 | 0.5500 | 0.0000 | 0.5084 | 0.4500 | 0.0000 | 0.00 | ##### |
| L-6030-A | Ucar 6030 Acrylic Latex C | G | 8.800 | 0.0000 | 0.4400 | 0.0000 | 0.4084 | 0.5600 | 0.0000 | 0.00 | ##### |
| C27 | MIX 10 MIN. | | | | | | | | | | |
| P-942-TIO | R-942 Gloss TIO 2 Slurry | G | 19.400 | 0.7650 | 0.0000 | 0.4527 | 0.0000 | 0.2350 | 0.0000 | 0.00 | ##### |
| C27 | MIX 10 MIN. | | | | | | | | | | |
| DF-475-MO | L-475 DREW DEFOAMER | G | 7.600 | 0.1000 | 0.9000 | 0.0345 | 0.9655 | 0.0000 | 0.0000 | 0.00 | ##### |
| C27 | MIX MIN. | | | | | | | | | | |
| C23 | END | | | | | | | | | | |
| C12 | USE AS NEEDED | | | | | | | | | | |
| T-8-PU | ACRYSOL RM-8W | G | 9.163 | 0.0000 | 0.1750 | 0.0000 | 0.0925 | 0.8250 | 0.0000 | 0.00 | ##### |
| S-1-W | Water | G | 8.330 | 0.0000 | 0.0000 | 0.0000 | 0.0000 | 1.0000 | 0.0000 | 0.00 | ##### |
| C35 | Hold Next Items | | | | | | | | | | |
| S-1-W | Water | G | 8.330 | 0.0000 | 0.0000 | 0.0000 | 0.0000 | 1.0000 | 0.0000 | 0.00 | ##### |
| 32–121 | Texanol | G | 7.914 | 0.0000 | 0.0000 | 0.0000 | 0.0000 | 0.0000 | 0.0000 | 0.00 | ##### |
| 00–000 | Letdown Total: | | | | | | | | | 0.00 | |

TABLE 6

| | | | | |
|---|---|---|---|---|
| Version # Code No. | #2B | Batch size 4.95 | | |
| Trade Name/Color | Semi-Gloss Latex Interior Wall Paint | | 100 Gallon | |
| Description | Pastel Base | | | |
| Reason for Change | Coalescing Study | LBS. | GAL. | |
| D1 | Dispersion: Grind | | | |
| S-1-W | Water | 100.00 | 12.00 | |
| BIO-95 | NUOSEPT 95 Preservative | 2.00 | 0.21 | |
| C16 | SLOW SPEED | | | |
| T-40-AC | Attagel-40 | 4.00 | 0.20 | |
| T-330-HEC | HERCULES WSP D-330 | 2.00 | 0.20 | |
| C17 | MEDIUM SPEED | | | |
| C27 | MIX MIN. | | | |
| DF-475-MO | L-475 DREW DEFOAMER | 2.00 | 0.26 | |
| C18 | FAST SPEED | | | |
| 00-684 | GRIND 20 MIN | | | |
| C17 | MEDIUM SPEED | | | |
| D-95-P | Strodex PK-95G | 2.00 | 0.21 | |
| NI-9-NP | Tergitol NP-9 | 2.00 | 0.23 | |
| B-95-AMN | AMP-95 | 2.20 | 0.28 | |
| DF-475-M | L-475 DREW DEFOAMER | 2.00 | 0.26 | |
| C27 | MIX MIN. | | | |
| C16 | SLOW SPEED | | | |
| C15 | CHECK GRIND | | | |
| C23 | END | | | |
| 00-000 | Grind Total: | 118.20 | 13.86 | |
| T1 | Thindown Mix | | | |
| S-1-W | Water | 51.58 | 6.19 | |
| S-1-G | Propylene Glycol | 30.21 | 3.50 | |
| C16 | SLOW SPEED | | | |
| T-2020-PU | ACRYSOL RM-2020NPR | 20.00 | 2.30 | |
| T-8-PU | ACRYSOL RM-8W | 17.14 | 1.87 | |
| D-5-SS | TRITON GR-5M Anionic | 0.50 | 0.06 | |
| C17 | MEDIUM SPEED | | | |
| C27 | MIX 10 MIN. | | | |
| C11 | ADD DISPERSION | | | |
| C27 | MIX 10 MIN. | | | |
| L-9100-VA | Rovace 9100 Latex Co-Polymer | 330.98 | 36.37 | |
| L-6030-A | Ucar 6030 Acrylic Latex Co-Polymer | 90.82 | 10.32 | |
| C27 | MIX 10 MIN. | | | |
| P-942-TIO | R-942 Gloss TIO 2 Slurry | 326.80 | 16.85 | |
| C27 | MIX 10 MIN. | | | |
| DF-475-MO | 1-475 DREW DEFOAMER | 2.00 | 0.26 | |
| C27 | MIX MIN. | | | |
| C23 | END | | | |
| C12 | USE AS NEEDED | | | |
| T-8-PU | ACRYSOL RM-8W | 2.60 | 0.28 | |
| S-1-W | Water | 13.42 | 1.61 | |
| C35 | ----- Hold Next Items | | | |
| S-1-W | Water | 35.60 | 4.27 | |
| 32-121 | Texanol | 17.80 | 2.25 | |
| 00-000 | Letdown Total | 939.45 | 86.14 | |
| Total: | | 1057.65 | 100.00 | |
| Viscosity (Ku): | 90–96 | VOC (grm/L) | 155.28 | Vis |
| pH: | 8.0–9.0 | RMC: | $0.00 | |
| 60° Gloss: | 40–55 | PVC: | 24.10 | |
| 85 Sheen: | | WPG: | 10.58 | |
| STD. Refl. (X) = | | | % WT | % VOL |
| STD. Refl. (Y) = | | Pigment | 24.07 | 7.86 |
| STD. Refl. (Z) = | | Binder | 22.86 | 24.59 |
| Contrast Ratio: | | Total | 46.93 | 32.61 |

TABLE 7

| | | | |
|---|---|---|---|
| Version # Code No. | #2D | Batch size | 0.95 |
| Trade Name/Color | Semi-Gloss Latex Interior Wall Paint | | 100 Gallon |
| Description | Pastel Base | | |
| Reason for Change | Thickener Base (Ucar 367 latex) | LBS. | GAL. |
| D1 | Dispersion: Grind | | |

TABLE 7-continued

| | | | |
|---|---|---|---|
| S-1-W | Water | 100.00 | 12.00 |
| BIO-95 | NUOSEPT 95 Preservative | 2.00 | 0.21 |
| C16 | SLOW SPEED | | |
| T-40-AC | Attagel-40 | 4.00 | 0.20 |
| T-330-HEC | HERCULES WSP D-330 | 2.25 | 0.23 |
| C17 | MEDIUM SPEED | | |
| C27 | MIX 5 MIN. | | |
| DE-022-Sil | BYK-022 DEFOAMER | 0.50 | 0.06 |
| C18 | FAST SPEED GRIND 20 MIN | | |
| C17 | MEDIUM SPEED | | |
| D-95-P | Strodex PK-95G | 2.00 | 0.21 |
| NI-9-NP | Tergitol NP-9 | 2.00 | 0.23 |
| B-95-AMN | AMP-95 GRIND 10 MIN | 2.20 | 0.28 |
| DF-475-MO | L-475 DREW DEFOAMER | 2.00 | 0.26 |
| C27 | MIX 10 MIN. | | |
| C16 | SLOW SPEED | | |
| C15 | CHECK GRIND | | |
| C23 | END | | |
| 00-000 | Grind Total: | 116.95 | 13.68 |
| T1 | Thindown Mix | | |
| S-1-W | Water | 78.74 | 9.45 |
| S-1-G | Propylene Glycol | 30.21 | 3.50 |
| C16 | SLOW SPEED | | |
| T-2020-PU | ACRYSOL RM-2020NPR | 0.00 | 0.00 |
| T-8-PU | ACRYSOL RM-8W | 0.00 | 0.00 |
| D-5-SS | TRITON GR-5M Anionic | 0.50 | 0.06 |
| DF-475-MO | L-475 DREW DEFOAMER | 1.00 | 0.13 |
| C17 | MEDIUM SPEED | | |
| C27 | MIX 10 MIN. | | |
| C11 | ADD DISPERSION | | |
| C27 | MIX 10 MIN. | | |
| L-367-VA | UCAR 367 Latex Co-Polymer | 330.98 | 36.37 |
| L-6030-A | Ucar 6030 Acrylic Latex Co-Polymer | 90.82 | 10.32 |
| C27 | MIX 10 MIN. | | |
| P-942-TIO | R-942 Gloss TIO 2 Slurry | 326.80 | 16.85 |
| C27 | MIX 10 MIN. | | |
| 32-121 | Texanol | 13.32 | 1.68 |
| DF-475-MO | L-475 DREW DEFOAMER | 2.00 | 0.26 |
| C27 | MIX MIN. | | |
| C23 | END | | |
| C12 | Paint Base Total | 991.32 | 92.31 |
| C12 | USE AS NEEDED | | |
| C35 | ----- Hold Next Items | | |
| T-8-PU | thickener | 40.71 | 4.44 |
| S-1-W | Water | 27.01 | 3.24 |
| 00-000 | Letdown Total | 1948.73 | 86.31 |
| Total: | | 1948.73 | 100.00 |

| | | | |
|---|---|---|---|
| Viscosity (Ku): | 90–96 | VOC (grm/L) | 144.34 |
| pH: | 8.0–9.0 | RMC: | #VALUE! |
| 60° Gloss: | 40–55 | PVC: | 24.24 |
| 85 Sheen: | | WPG: | 20.66 |
| STD. Refl. (X) = | | | % WT |
| STD. Refl. (Y) = | | Pigment | 12.32 |
| STD. Refl. (Z) = | | Binder | 11.68 |
| Contrast Ratio: | | Total | 24.00 |

Example 2

Latex Evaluation

A vinyl-acrylic copolymer and acrylic copolymer blend (18% on total latex weight solids) was evaluated with various amounts of Texanol® or the fatty acid propylene glycol ester (PGME) to determine mechanism of thickening. No other paint additives or thickeners were added. The latex particle coalescing aids were added from zero to 8% at 2% increments based on latex weight solids. Latex viscosities were evaluated using a Stormer viscometer (krebs units) and a Brookfield viscometer (cPs). Viscosity data (FIG. 5) demonstrates that the viscosities were equal between the coalescing aids with no significant increase using the polyunsaturated fatty acid ester. The slight viscosity increases observed with increasing percent amount of coalescent aid are typical of viscosity increases due to slight emulsion particle swelling upon addition and migration of the coalescing aid into the emulsion particle.

Example 3

Figure 6:
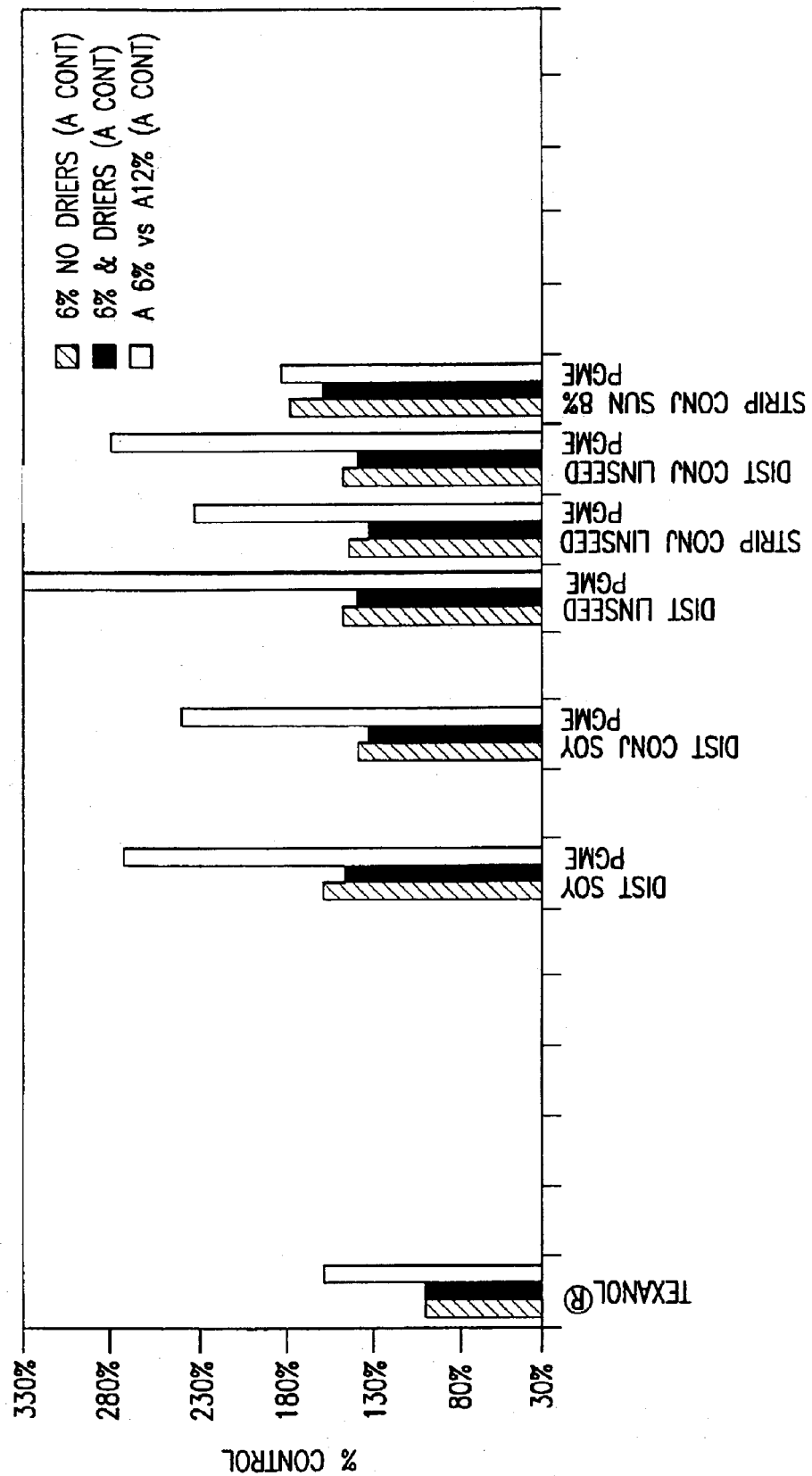
FIGS. 6 and 7 depict scrub resistance data of paint formulations comprising additives of various fatty acid propylene glycol monoesters where the fatty acids are derived from different oils.
Figure 7:
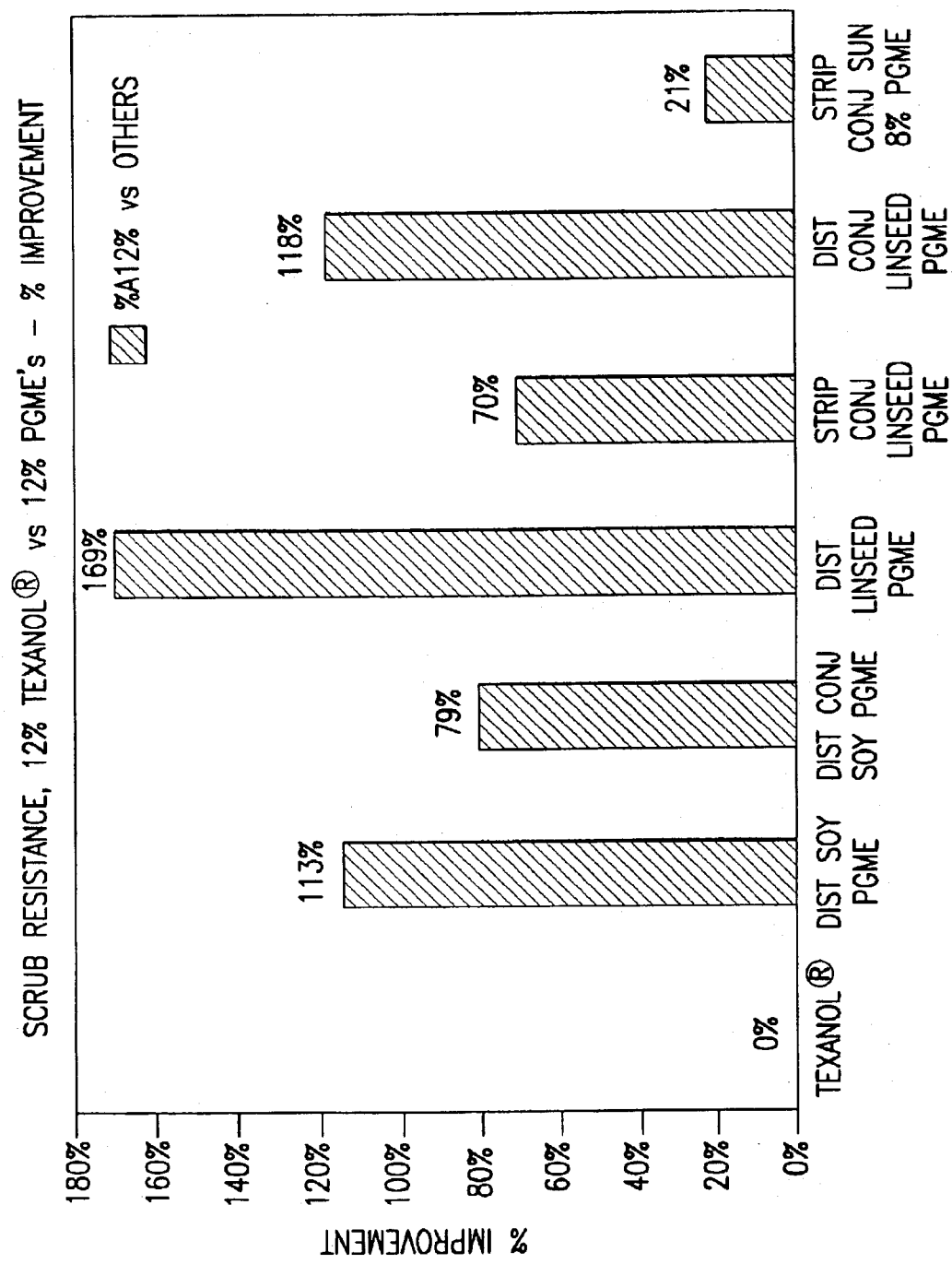

A scrub test was performed to determine the film integrity and water resistance of dry paint films of paint formulations containing propylene glycol fatty acid monoesters (PGME). Various polyunsaturated fatty acid moieties derived from vegetable oils were chemically attached to propylene glycol through ester linkages. Panels were coated with one of the paint formulations containing a PGME and allowed to cure over a period of one week. Each panel was placed on a scrub machine. The scrub machine moves a wire brush over the panel in a back and forth motion. Each forward and backward scrub is counted as one cycle. When a paint film breaks completely through exposing the substrate (failure), the cycle number is recorded. Data represents the number of cycles in percentage relative to control. A control panel is tested for each panel tested with a test paint formulation. Each paint formulation is tested in duplicate. Scrub resistance data (FIGS. 6 and 7) demonstrate the improvement in durability of a paint film that contains PGME versus Texanol®. The data shown in FIG. 6 represent scrub tests for three separate PGME containing formulations of each specified vegetable oil versus Texanol® containing paint formulations. The left bar shows the results of the test using a 6% PGME containing the polyunsaturated acid moiety derived from the specified vegetable oil versus 6% Texanol® as a control. The formulations did not contain a metal drying agent. The middle bar represents the same formulations with a metal drying agent. The right bar shows the results of an experiment using 12% PGME formulations and a 12% Texanol® formulation versus 6% Texanol® as a control. The data show that the formulations containing the polyunsaturated fatty acid additive possess a more durable coat compared to Texanol®.

Example 4

Synthesis of Poly(ethylene oxide)-Fatty Acid Diester Reactive Associative Thickener for Latex Paints Poly(ethylene oxide) (50 g, $<M_n>$=15210 g/mol, $<M_w>$=15990 g/mol) was added to a solution of soybean oil methyl esters (100 g), N-methyl-2pyrrolidone (30 mL) and potassium carbonate (2.0 g, 0.014 mol) in a 250 mL round bottom flask equipped with a magnetic stir bar, condenser, vacuum adapter, and receiving flask. The molecular weight of the poly(ethylene oxide) was determined by gel permeation chromatography (FIG. 8). The reaction mixture was heated 150–155° C. under vacuum and allowed to stir for 16 hours. The reaction mixture was cooled below 100° C. and precipitated into a solution of hexane and ethyl acetate (5:1). The white precipitate was recovered via suction filtration and dried under vacuum. The average molecular weight of the product, determined by gel permeation chromatography, was found to be 15810 g/mol with a polydispersity index of 1.04 (FIG. 9).

Example 5

Synthesis of Reactive Associative Thickener for Latex Paints

Poly(ethylene oxide) 30.5 g, $<M_n>$=15210 g/mol, $<M_w>$=15990 g/mol) was added to a solution of epoxidized soybean oil (0.9 g), N-methyl-2-pyrrolidone (35 mL) and potassium carbonate (1.0 g, 0.007 mol) in a 250 mL round bottom flask equipped with a magnetic stir bar, condenser, vacuum adapter, and receiving flask. The molecular weight of poly(ethylene oxide) was determined by gel permeation chromatography (FIG. 8). The reaction mixture was heated to 150–155° C. under vacuum and allowed to stir for 1 hour. Soybean oil methyl esters (40 mL) were then added to the reaction mixture. The reaction mixture was allowed to stir for an additional 15 hours. The reaction mixture was then cooled below 100° C. and precipitated into a solution of hexane and ethyl acetate (5:1). The white precipitate was recovered via suction filtration and dried under vacuum. The number average molecular weight of the product, determined by gel permeation chromatography, was found to be 16250 g/mol with a polydispersity index of 1.05 (FIG. 10).

Example 6

Evaluation of Poly(ethylene oxide) as an Associative Thickener in Latex Paint Latex paint formula #2D shown in Table 7 was used for thickener evaluation. The latex paint had an initial viscosity of 60 KU (stormer) and ~a0.2 (ICI) before the addition of any thickener. Latex paint (260 g) was added to a half-pint can. Poly(ethylene oxide) (2.3 g) used in the previous examples was premixed with 1.9 g of butyl carbitol and 15 mL of demonized water in a 25 mL beaker. The poly(ethylene oxide) solution was added to the latex paint with over head stirring at 1000 RPM. The viscosity of the latex paint was 57 KU after the addition of the PEO solution. Therefore, poly(ethylene oxide) did not show any thickening effect in the latex paint.

Example 7

Evaluation of Poly(ethylene oxide)-Diester as an Associative Thickener in Latex Paint Latex paint formula #2D shown in Table 7 was used for thickener evaluation. The latex paint had an initial viscosity of 60 KU (stormer) before the addition of any thickener. Latex paint (281.2 g) was added to half-pint can. Poly(ethylene oxide)-fatty acid diester (2.16 g) from Example 1 was premixed with 2.16 g of butyl carbitol and 13.9 g of deionized water in a 25 mL beaker. The premixed solution was added to the latex paint with overhead stirring at 1000 RPM. The viscosity of the latex paint was 73.4 KU (stormer) and 0.55 (ICI) after the addition of the thickener solution.

Example 8

Evaluation of Poly(ethylene oxide)-Epoxidized Soybean Oil-Fatty Acid Ester as an Associative Thickener in Latex Paint Latex paint formula #2D shown in Table 7 was used for thickener evaluation. The latex paint had an initial viscosity of 60 KU (stormer) before the addition of any thickener. Latex paint (281.2 g) was added to a half-pint can. Poly(ethylene oxide)-epoxidized soybean oil-fatty acid ester (2.16 g) from Example 2 was premixed with 2.16 g of butyl carbitol and 13.9 g of deionized water in a 25 mL beaker. The premixed solution was added to the latex paint with overhead stirring at 1000 RPM. The viscosity of the latex paint was 101.6 KU (stormer) and 1.31 (ICI) after the addition of the thickener solution.

Having now fully described this invention, it will be understood to those of ordinary skill in the art that the same can be performed within a wide and equivalent range of conditions, formulations, and other parameters without affecting the scope of the invention or any embodiment thereof. All patents, patent applications, and publications cited herein are fully incorporated by reference herein in their entirety.

What is claimed is:

1. A composition comprising:
   a. a latex polymer, and
   b. a polyunsaturated fatty acid or derivative thereof chemically attached to a water soluble polymer, said polymer being selected from the group consisting of anionic and cellulosic polymers.

2. The composition of claim 1, wherein said polyunsaturated fatty acid or derivative thereof is derived from a vegetable oil, genetically modified vegetable oil, or chemically or enzymatically modified vegetable oil.

3. The composition of claim 2, wherein said vegetable oil is selected from the group consisting of soybean oil, linseed oil, sunflower oil, corn oil, perilla oil, oiticica oil, canola oil, rapeseed oil, castor oil, cottonseed oil, peanut oil, palm oil, tung oil and safflower oil.

4. The composition of claim 3, wherein said polyunsaturated fatty acid or derivative thereof contains conjugated sites of unsaturation.

5. The composition of claim 4, wherein said chemical attachments are an ester, ether, amide or urethane linkage.

6. The composition of claim 5 further comprising, a metal drying agent selected from the group consisting of cobalt, manganese, zirconium, iron, lead, cerium, calcium, zinc, vanadium and mixtures thereof.

7. The composition of claim 1, wherein said polyunsaturated fatty acid or derivative thereof is chemically attached to an anionic polymer.

8. The composition of claim 7, wherein said anionic polymer is comprised of vinylic monomers selected from the group comprising acrylic acid and methacrylic acid, wherein said polyunsaturated fatty acid or derivative thereof is chemically attached to at least one of said monomers comprising said polymer.

9. The composition of claim 1, wherein said polyunsaturated fatty acid or derivative thereof is chemically attached to a cellulosic polymer.

10. The composition of claim 9, wherein said polymer is selected from the group consisting of xanthum gum, casboxymethylcellulose, hydroxyethyl cellulose and hydroxypropyl cellulose.

11. A method of making the composition of claim 1 comprising adding to an aqueous latex polymer, a polyunsaturated fatty acid or derivative thereof chemically attached to a polymer, said polymer being selected from the group consisting of anionic and cellulosic polymers.

12. The composition of claim 1, wherein said composition is cured to form a durable water resistant coating.

13. A composition comprising:
   a. a latex polymer, and
   b. a polyunsaturated fatty acid or derivative thereof chemically attached to an ethylene oxide polymer, wherein said polymer has a molecular weight of about 16,000 g/mol.

14. The composition of claim 13, wherein said polyunsaturated fatty acid or derivative thereof is derived from a vegetable oil, genetically modified vegetable oil, or chemically or enzymatically modified vegetable oil.

15. The composition of claim 14, wherein said vegetable oil is selected from the group consisting of soybean oil, linseed oil, sunflower oil, corn oil, perilla oil, oiticica oil, canola oil, rapeseed oil, castor oil, cottonseed oil, peanut oil, palm oil, tung oil and safflower oil.

16. The composition of claim 15, wherein said polyunsaturated fatty acid or derivative thereof contains conjugated sites of unsaturation.

17. The composition of claim 16, wherein said chemical attachments are an ester, ether, amide or urethane linkage.

18. The composition of claim 17, wherein said polyunsaturated fatty acid or derivative thereof is chemically attached at each terminus of an ethylene oxide polymer.

19. The composition of claim 18 further comprising, a metal drying agent selected from the group consisting of cobalt, manganese, zirconium, iron, lead, cerium, calcium, zinc, vanadium and mixtures thereof.

20. The composition of claim 13, wherein said composition is cured to form a durable water resistant coating.

21. A method of making the composition of claim 13 comprising adding to an aqueous latex polymer, a polyunsaturated fatty acid or derivative thereof chemically attached to an ethylene oxide polymer, wherein said polymer has a molecular weight of about 16,000 g/mol.

* * * * *